(12) United States Patent
Saperton

(10) Patent No.: US 11,779,118 B2
(45) Date of Patent: Oct. 10, 2023

(54) SEAT PLATE GAS CYLINDER QUICK-RELEASE DEVICE

(71) Applicant: B&Z Productions LLC, Phoenix, AZ (US)

(72) Inventor: Michael S. Saperton, Phoenix, AZ (US)

(73) Assignee: B&Z Productions LLC, Phoenix, AZ (US)

( * ) Notice: Subject to any disclaimer, the term of this patent is extended or adjusted under 35 U.S.C. 154(b) by 0 days.

(21) Appl. No.: 18/089,260

(22) Filed: Dec. 27, 2022

(65) Prior Publication Data

US 2023/0126607 A1 Apr. 27, 2023

Related U.S. Application Data

(63) Continuation-in-part of application No. 17/389,666, filed on Jul. 30, 2021, now Pat. No. 11,533,999.

(60) Provisional application No. 63/059,120, filed on Jul. 30, 2020.

(51) Int. Cl.
| | |
|---|---|
| *A47C 7/00* | (2006.01) |
| *A47C 9/10* | (2006.01) |
| *A47C 3/30* | (2006.01) |
| *A47C 4/02* | (2006.01) |
| *F16B 9/00* | (2006.01) |
| *A47C 3/18* | (2006.01) |
| *A47B 9/10* | (2006.01) |

(52) U.S. Cl.
CPC ............... *A47C 4/02* (2013.01); *A47C 3/18* (2013.01); *A47C 7/004* (2013.01); *F16B 9/05* (2018.08); *A47B 9/10* (2013.01); *A47C 3/30* (2013.01)

(58) Field of Classification Search
CPC .... A47C 4/02; A47C 3/18; A47C 3/30; A47C 7/004; F16B 9/05; A47B 9/10
USPC .................................................... 297/344.19
See application file for complete search history.

(56) References Cited

U.S. PATENT DOCUMENTS

| | | | |
|---|---|---|---|
| 1,930,021 A * | 10/1933 | Powell | A47C 7/004 |
| | | | 248/188.7 |
| 2,703,691 A | 3/1955 | Minnis | |
| 3,788,587 A | 1/1974 | Stemmler | |
| 3,790,119 A | 2/1974 | Bauer | |
| 3,820,844 A | 6/1974 | Fortnam | |
| 3,891,270 A | 6/1975 | Crossman et al. | |
| 4,283,033 A | 8/1981 | Bauer | |

(Continued)

FOREIGN PATENT DOCUMENTS

| | | |
|---|---|---|
| CN | 2412830 Y | 1/2001 |
| CN | 2758163 | 2/2006 |

(Continued)

*Primary Examiner* — Robert Canfield
(74) *Attorney, Agent, or Firm* — THOMAS W. GALVANI, P.C.; Thomas W. Galvani

(57) ABSTRACT

A quick-release device is for securing a rod of any gas cylinder into the plate of any chair, item of furniture, or other device supported by a gas cylinder and activating the rod with a button thereon. This universal quick-release device includes a sleeve in in the seat plate, an adapter fit into the sleeve, the adapter including an upper portion and a lower portion with different inner and outer diameters. The sleeve is configured to receive the lower portion of the adapter in a press-fit engagement. The upper portion is configured to receive the rod of the gas cylinder in a removable engagement.

16 Claims, 21 Drawing Sheets

(56) References Cited

U.S. PATENT DOCUMENTS

| | | |
|---|---|---|
| 4,580,749 A | 4/1986 | Howard |
| 4,623,195 A | 11/1986 | Avella |
| 4,905,951 A | 3/1990 | Putness |
| 4,979,718 A | 12/1990 | Bauer et al. |
| 5,383,644 A * | 1/1995 | Huse .................... F16M 11/041 |
| | | 248/501 |
| 5,476,020 A | 12/1995 | Garvey et al. |
| 5,740,997 A | 4/1998 | Wieran |
| 5,882,076 A | 3/1999 | Garelick et al. |
| 6,004,064 A | 12/1999 | Franz |
| 6,012,775 A | 1/2000 | Czarnecki |
| 6,022,077 A * | 2/2000 | Kirkland ................ B63B 29/06 |
| | | 248/404 |
| 6,030,037 A | 2/2000 | Ritch et al. |
| 6,082,680 A | 7/2000 | Woodward et al. |
| 6,116,183 A | 9/2000 | Crow et al. |
| 6,142,571 A | 11/2000 | Benden |
| 6,352,308 B1 * | 3/2002 | Chen ...................... A47C 7/004 |
| | | 297/344.21 |
| 6,361,110 B2 * | 3/2002 | Roslund, Jr. ......... A47C 1/03266 |
| | | 248/404 |
| 6,419,320 B1 * | 7/2002 | Wang ................. A47C 1/03255 |
| | | 297/302.6 |
| 6,578,804 B2 * | 6/2003 | Lin ....................... A47C 7/004 |
| | | 248/188.7 |
| 6,607,246 B1 | 8/2003 | Benden |
| 6,695,407 B1 | 2/2004 | Lin |
| 6,941,621 B1 | 9/2005 | Wolforth et al. |
| 7,229,054 B2 * | 6/2007 | Hu ....................... A47C 7/5066 |
| | | 248/188.1 |
| 7,451,958 B2 | 11/2008 | Ritter et al. |
| 7,452,034 B2 | 11/2008 | Jung |
| 7,938,377 B2 | 5/2011 | Draghici et al. |
| 8,052,218 B2 | 11/2011 | Grove |
| 8,075,056 B2 | 12/2011 | Glockl et al. |
| 8,167,373 B2 * | 5/2012 | Allison ..................... A47C 3/30 |
| | | 297/344.19 |
| 8,246,118 B2 | 8/2012 | Moore |
| 8,827,216 B2 | 9/2014 | Brown et al. |
| 8,888,184 B2 | 11/2014 | Meyer et al. |
| 8,888,398 B2 | 11/2014 | Werth |
| 8,979,050 B2 | 3/2015 | Yu |
| 9,144,315 B1 * | 9/2015 | Cheng .................... A47C 7/506 |
| 9,220,346 B1 * | 12/2015 | Wu ....................... A47C 7/5064 |
| 9,578,969 B1 | 2/2017 | Su |
| 9,642,465 B1 | 5/2017 | Park |
| 9,706,849 B2 | 7/2017 | Su |
| 10,260,671 B2 | 4/2019 | James et al. |
| 10,772,432 B2 | 9/2020 | Park et al. |
| 10,794,529 B2 | 10/2020 | James et al. |
| 11,045,002 B1 * | 6/2021 | Saperton ................ A47C 7/004 |
| 11,096,494 B1 * | 8/2021 | Tsai ......................... A47C 7/02 |
| 2002/0185574 A1 * | 12/2002 | Lin ........................ A47C 7/004 |
| | | 248/188 |
| 2003/0151291 A1 * | 8/2003 | Lin ........................ A47C 7/004 |
| | | 297/423.38 |
| 2004/0173954 A1 * | 9/2004 | Pooschen ................ A47C 3/30 |
| | | 267/64.11 |
| 2006/0043245 A1 | 3/2006 | Baker et al. |
| 2006/0214489 A1 | 9/2006 | Cheng |
| 2007/0102979 A1 * | 5/2007 | Tedesco .................. A47C 3/30 |
| | | 297/461 |
| 2007/0290539 A1 * | 12/2007 | Hosoe ................... A47C 1/023 |
| | | 297/354.11 |
| 2009/0208277 A1 | 8/2009 | Werth |
| 2009/0256050 A1 * | 10/2009 | Huang ..................... A47C 3/30 |
| | | 248/631 |
| 2011/0272994 A1 * | 11/2011 | Walser .................. A47C 7/004 |
| | | 297/463.1 |
| 2013/0038109 A1 * | 2/2013 | Chi .......................... A47C 3/30 |
| | | 297/344.19 |
| 2014/0271036 A1 | 9/2014 | Emmerich |
| 2015/0123441 A1 * | 5/2015 | Duke .................. A47C 1/03255 |
| | | 297/300.4 |
| 2016/0316913 A1 * | 11/2016 | Kjellman ............... A47C 7/004 |
| 2017/0350552 A1 * | 12/2017 | James .................. A47B 13/021 |
| 2019/0249819 A1 | 8/2019 | James et al. |
| 2019/0269248 A1 | 9/2019 | Beloff |
| 2021/0001165 A1 * | 1/2021 | Stilson ............... A63B 21/0728 |
| 2021/0212468 A1 * | 7/2021 | Benesch ................ A47C 7/006 |
| 2022/0087424 A1 * | 3/2022 | Goetz .................... A47C 7/024 |

FOREIGN PATENT DOCUMENTS

| | | |
|---|---|---|
| CN | 101549735 A | 10/2009 |
| CN | 210204050 U | 3/2020 |
| GB | 2120088 A | 11/1983 |
| JP | H1037570 A | 2/1998 |
| JP | 2895447 B2 | 5/1999 |
| JP | 2008132298 A | 6/2008 |
| WO | 2009084915 A1 | 7/2009 |

\* cited by examiner

SEAT PLATE GAS CYLINDER QUICK-RELEASE DEVICE

CROSS-REFERENCE TO RELATED APPLICATIONS

This application is a continuation-in-part of and claims the benefit of U.S. patent application Ser. No. 17/389,666, filed Jul. 30, 2021, which claims the benefit of U.S. Provisional Application No. 63/059,120, filed Jul. 30, 2020, both of which are hereby incorporated by reference.

FIELD

The present specification relates generally to furniture, and more particularly to devices for assembling and disassembling furniture quickly and easily.

BACKGROUND

In the exhibitor and conference industry, office furniture is repeatedly transported in trucks, unpacked, set up, used, and then packed back into the trucks for transportation to a warehouse or other storage facility. Some pieces of furniture—conference tables, media screens, speakers, etc.—are fairly easy to pack; they can be laid flat, rolled up, or packed into road cases and then placed into the truck. Items such as these may be densely packed because they are either large and heavy or small.

Some types of furniture, such as office chairs, salon and cosmetology chairs and table tops, present packing issues. Table tops generally must be completely dismantled or broken down. Office chairs are relatively light but are quite large and cumbersome. They usually cannot be laid flat, rolled up, or packed into a box. Most office chairs cannot be disassembled. Almost all office chairs have a seat back and a seat bottom mounted on a seat plate. The seat plate connects to a gas-lift or non-gas-lift cylinder piston that is then mounted in a wheelbase. Moreover, tall draft chairs usually have footrest rings or split rings mounted on the gas-lift cylinder piston. None of the pieces are separable from the chair in the conventional art.

At least one invention, disclosed in U.S. Pat. No. 10,260,671 entitled Gas Cylinder Quick Release Device, describes devices for separating the gas cylinder piston (also known simply as a "gas cylinder") from the seat bottom and from the wheelbase. Gas cylinders typically have an external sleeve and a rod which reciprocates in the sleeve. The rod is usually directed upward while the sleeve is downward, such that the rod is press fit into the seat plate and the sleeve is press fit into the wheelbase. A fastened socket in the seat plate receives the rod, and a socket—generally a circular hole—in the wheelbase receives the sleeve. When the chair is assembled in this fashion and a user sits in the chair, the rod and sleeve further press into the seat plate and the wheelbase, setting the gas cylinder securely. Over just a few hours, the gas cylinder is driven into a firm and very secure press-fit engagement with the seat plate and the wheelbase. Over days, months, and years, the gas cylinder becomes nearly permanently seated into the seat plate and the wheelbase.

The gas cylinder is quite difficult to separate from the chair or seat plate. There are few effective means for removing the gas cylinder from the chair. While the wheelbase can sometimes be removed by hitting it off the gas cylinder with a mallet, this can obviously cause a great deal of damage to the wheelbase. Hitting the seat plate—or the gas cylinder—to try to remove the gas cylinder from the seat plate will ruin either, or potentially both. There remains a need for a safe, easy, and effective way to decouple or remove the gas cylinder from the seat plate.

SUMMARY

An embodiment of a quick-release device for securing a gas cylinder in a seat plate includes a pedestal defining a socket for receiving the gas cylinder. The pedestal projects upwardly from an endwall to form a jaw against which the gas cylinder is received when applied to the socket. A clamp is pivoted to the jaw for movement between an open position and a closed position. A flange is formed in the pedestal and has a lower surface for confrontation with the seat plate. A latch is coupled to the pedestal. The latch moves between a first position enabling movement of the clamp between the open and closed positions, and a second position disabling movement of the clamp between the open and closed positions. The clamp is pivoted to the pedestal above the flange. The endwall of the pedestal includes a central hole formed through the endwall at a geometric center thereof. The latch includes a cam and a handle extending therefrom. A bolt is carried in the jaw, and the latch is coupled to the bolt to move in pivotal movement between the first and second positions. The pedestal further includes a stem below the flange, and the stem configured to be inserted into the seat plate to be secured therein. In the closed position of the clamp, and when the gas cylinder is received in the socket, the clamp bears the gas cylinder in confrontation against the jaw. In the open position of the clamp, and when the gas cylinder is received in the socket, the clamp releases the gas cylinder from confrontation against the jaw.

In an embodiment, a quick-release device for securing a gas cylinder in a seat plate includes a pedestal having a cylindrical stem and a semi-cylindrical jaw projecting above the stem, and a socket defined therein to receive the gas cylinder. A clamp is pivoted to the jaw for movement between an open position and a closed position. A latch is coupled to the pedestal, which latch moves between a first position enabling movement of the clamp between the open and closed positions, and a second position disabling movement of the clamp between the open and closed positions. In the closed position of the clamp, and when the gas cylinder is received in the socket, the clamp bears the gas cylinder in confrontation against the jaw. In the open position of the clamp, and when the gas cylinder is received in the socket, the clamp releases the gas cylinder from confrontation against the jaw. A flange is formed in the pedestal, and the flange has a lower surface for confrontation with the seat plate. The clamp is pivoted to the pedestal above the flange. The pedestal further includes a stem below the flange, and the stem is configured to be inserted into the seat plate to be secured therein. The pedestal projects upwardly from an endwall, and the endwall includes a central hole formed through the endwall at a geometric center thereof. The latch includes a cam and a handle extending therefrom. A bolt is carried in the jaw, and the latch is coupled to the bolt to move in pivotal movement between the first and second positions.

In an embodiment, a quick-release device for securing a gas cylinder in a seat plate includes a pedestal defining a socket for receiving the gas cylinder. The pedestal projects upwardly to form a jaw against which the gas cylinder is received when applied to the socket. A clamp is pivoted to the jaw for movement between an open position and a closed position. A latch is coupled to the pedestal, and the latch moves between a first position enabling movement of the clamp between the open and closed positions, and a second position disabling movement of the clamp between the open and closed positions. The pedestal is formed monolithically to a base, and the base configured to be received in the seat plate. The pedestal further includes a cylinder projecting upward from the base to the jaw and to below the clamp pivoted to the jaw. A central hole is formed through the base at a geometric center of the cylinder. The latch includes a cam and a handle extending therefrom. A bolt is carried in the jaw, and the latch is coupled to the bolt to move in pivotal movement between the first and second positions.

A quick-release device is for securing a rod of a gas cylinder in a seat plate and activating the rod with a button thereon. The quick-release device includes a sleeve in in the seat plate, an adapter fit into the sleeve, the adapter including an upper portion and a lower portion with different inner and outer diameters. The sleeve is configured to receive the lower portion of the adapter in a press-fit engagement. The upper portion is configured to receive the rod of the gas cylinder in a removable engagement.

In embodiments, sleeve is tapered. The outer diameter of the upper portion of the adapter is greater than the outer diameter of the lower portion. A set screw extends through the upper portion of the adapter to secure the rod in the upper portion when applied thereto. A pin is maintained in the adapter for reciprocal movement to depress the button on the rod. The pin includes two clips which project radially outward to define interferences with the inner diameter of the adapter to limit the reciprocal movement of the pin. The pin includes a top face configured for confrontation with the button and depression thereof.

In an embodiment, a quick-release device for securing a rod of a gas cylinder in a seat plate having a sleeve and activating the rod with a button thereon includes a sleeve having a tapered inner diameter. An adapter is fit into the sleeve, and the adapter includes an upper portion and a lower portion, each with inner and outer diameters. The sleeve is configured to receive the lower portion of the adapter in a press-fit engagement. The upper portion is configured to receive the rod of the gas cylinder in a removable engagement.

In embodiments, the sleeve is fixed to the seat plate. The outer diameter of the upper portion of the adapter is greater than the outer diameter of the lower portion. A set screw extends through the upper portion of the adapter to secure the rod in the upper portion when applied thereto. A pin is maintained in the lower portion of the adapter for reciprocal movement to depress the button on the rod. The pin includes two clips which project radially outward to define interferences with the inner diameter of the adapter to limit the reciprocal movement of the pin. The pin includes a top face configured for confrontation with the button and depression thereof.

In an embodiment, a quick-release device is for securing a rod of a gas cylinder in a seat plate and activating the rod with a button thereon and includes a sleeve and an adapter fit into the sleeve. The adapter has an upper portion and a lower portion, each with inner and outer diameters. A pin is maintained in the adapter for reciprocal movement to depress the button on the rod. The sleeve is configured to receive the lower portion of the adapter in a press-fit engagement. The upper portion is configured to receive the rod of the gas cylinder in a removable engagement.

In embodiments, the sleeve has a tapered inner diameter. The outer diameter of the upper portion of the adapter is greater than the outer diameter of the lower portion. A set screw extends through the upper portion of the adapter to secure the rod in the upper portion when applied thereto. The pin includes two interferences which project radially outward from the pin to contact the inner diameters of the adapter to limit the reciprocal movement of the pin. The pin includes a top face configured to confrontation with the button and depression thereof.

The above provides the reader with a very brief summary of some embodiments described below. Simplifications and omissions are made, and the summary is not intended to limit or define in any way the disclosure. Rather, this brief summary merely introduces the reader to some aspects of some embodiments in preparation for the detailed description that follows.

BRIEF DESCRIPTION OF THE DRAWINGS

Referring to the drawings.

DETAILED DESCRIPTION

Figure 1:
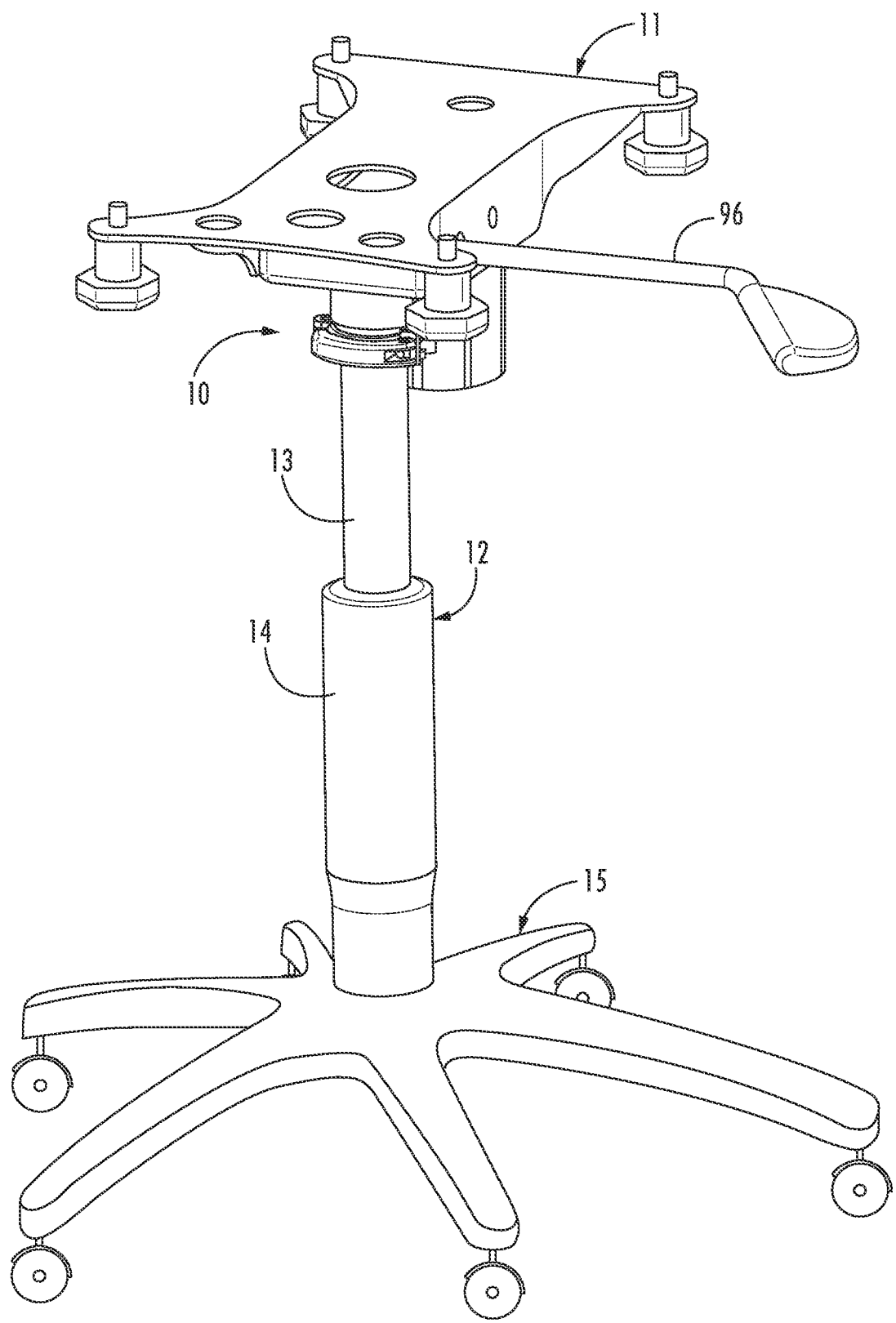
FIG. 1 is a top perspective view of a bottom of an office chair, illustrating a seat plate, a quick-release device, a gas cylinder assembly, and a wheelbase.

Reference now is made to the drawings, in which the same reference characters are used throughout the different figures to designate the same elements. Briefly, the embodiments presented herein are preferred exemplary embodiments and are not intended to limit the scope, applicability, or configuration of all possible embodiments, but rather to provide an enabling description for all possible embodiments within the scope and spirit of the specification. Description of these preferred embodiments is generally made with the use of verbs such as "is" and "are" rather than "may," "could," "includes," "comprises," and the like, because the description is made with reference to the drawings presented. One having ordinary skill in the art will understand that changes may be made in the structure, arrangement, number, and function of elements and features without departing from the scope and spirit of the specification. Further, the description may omit certain information which is readily known to one having ordinary skill in the art to prevent crowding the description with detail which is not necessary for enablement. Indeed, the diction used herein is meant to be readable and informational rather than to delineate and limit the specification; therefore, the scope and spirit of the specification should not be limited by the following description and its language choices.

FIG. 1 is a perspective view of the lower half of a chair such as an office chair, and includes a seat plate 11, a gas cylinder assembly 12 (hereinafter "gas piston" or "gas cylinder") including a rod 13 and a housing or sleeve 14, and a wheelbase 15. The rod 13 (cylinder) is within the sleeve 14 of the gas cylinder 12 and engaged in the seat plate 11, and the bottom of the sleeve is press-fit into a wheelbase 15. A quick-release device 10 (also referred to herein simply as "the device 10") is secured to a cup of the seat plate 11 to which the rod 13 is engaged. In FIG. 1, the seat bottom and back of the chair are removed for clarity of the illustration. This specification describes a chair for convenience of the explanation, but a chair is just one exemplary device on which the device 10 is suitable for use; it can also be used with any device which incorporates a gas cylinder similar to the gas cylinder 12.

Figure 2A:
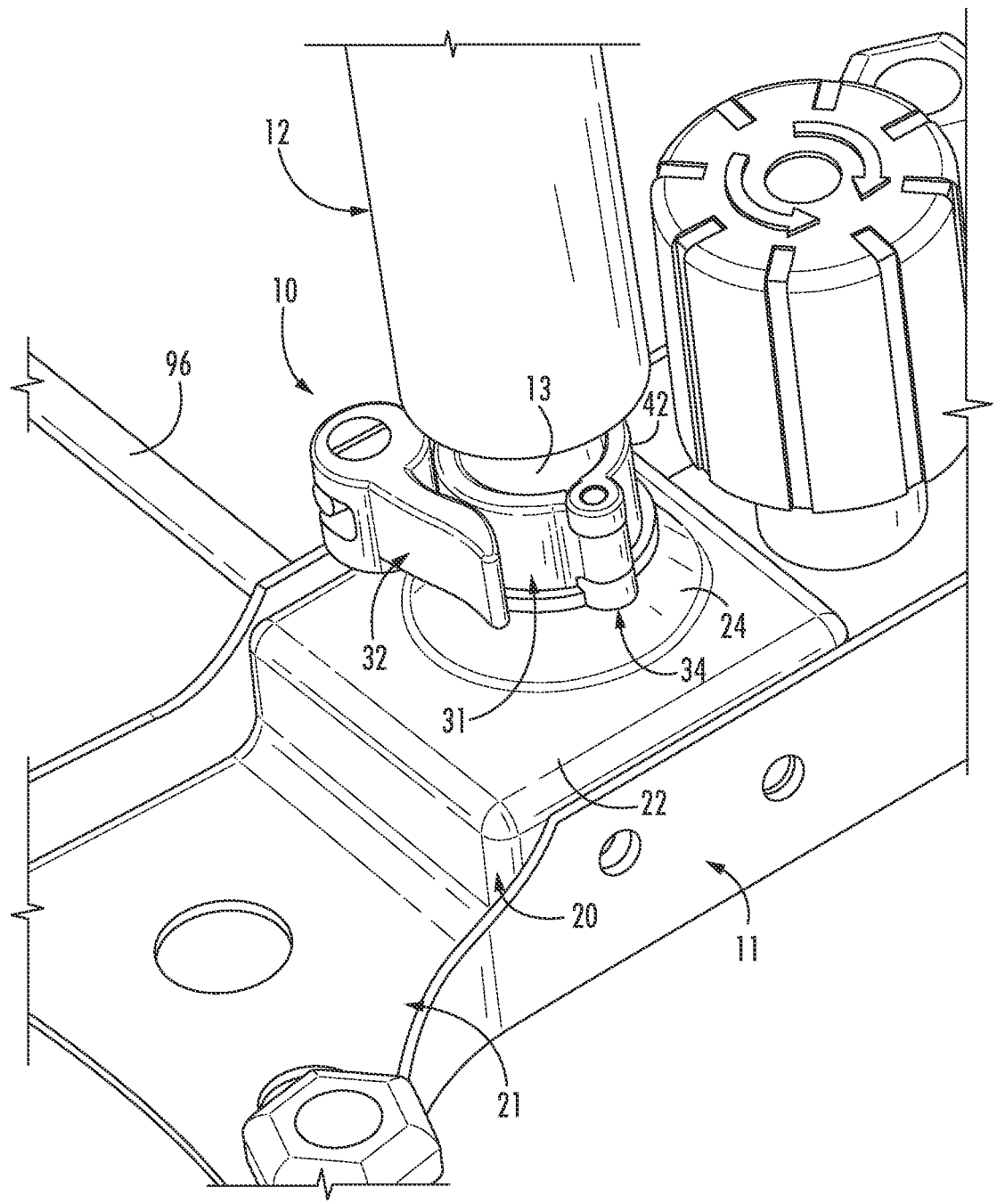
FIGS. 2A and 2B are left and right, inverted bottom perspective views of the quick-release device of FIG. 1 in the seat plate with a gas cylinder assembly applied thereto.
Figure 2B:
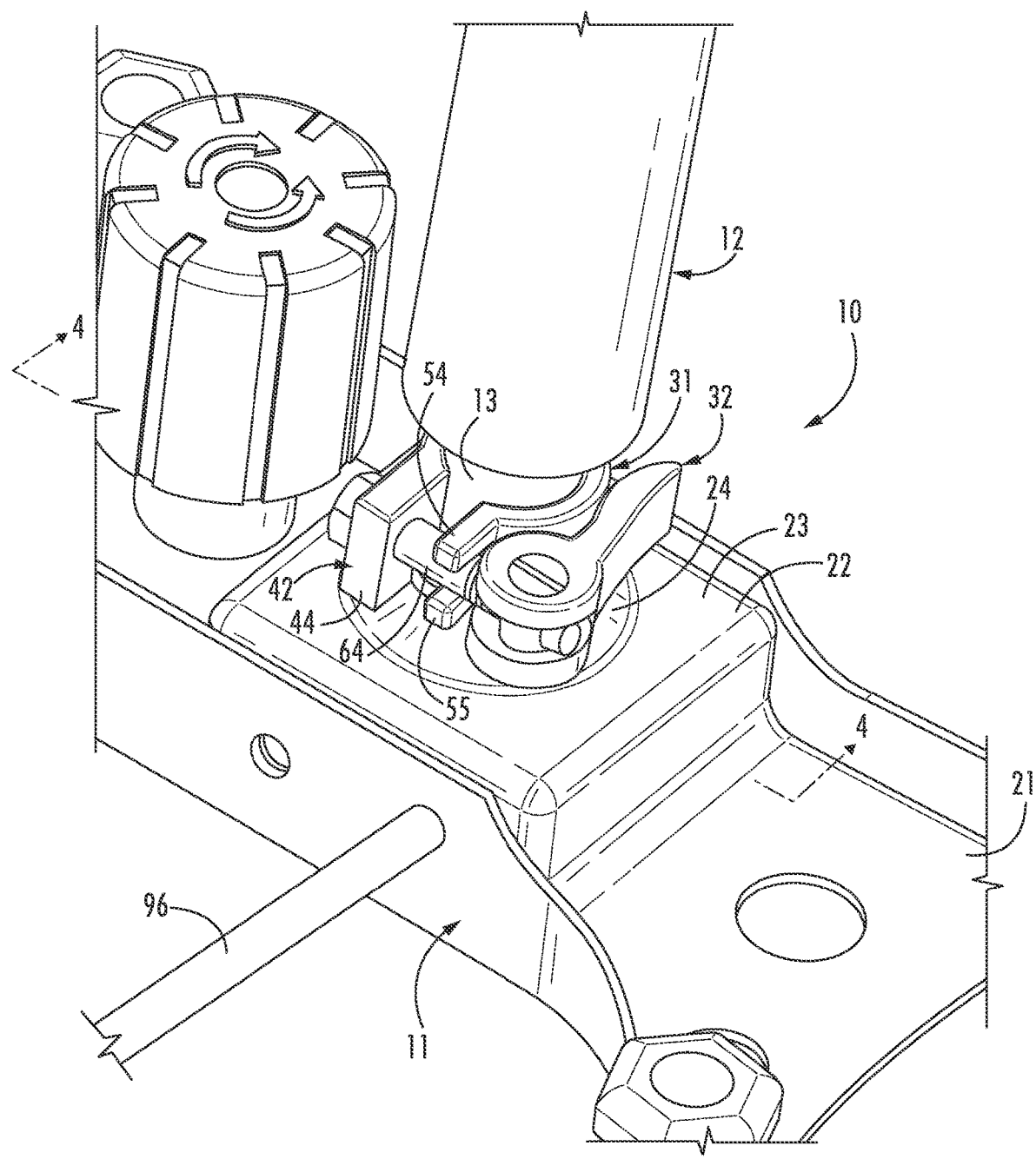

FIGS. 2A and 2B illustrate the chair in an inverted position, as if the seat bottom were resting on the ground, from both the left and right sides. The wheelbase 15 is not shown for clarity of the illustrations, nor is the seat bottom.

A base 20 is carried within the seat plate 11. The base 20 projects upwardly from the seat plate between two sides of the seat plate 11. Briefly, it is noted here that in all drawings except FIG. 1, the chair is shown in an inverted position, and so the directions of "up" and "down" and like terms are used in an inverted fashion with respect to the orientation they would take when the chair is used in an upright manner. Referring now also to the section view of FIG. 4, the base 20 is generally box-shaped; it includes a lower box 21 and a smaller upper box 22. Both the upper and lower boxes 21 and 22 have fronts and backs, and sides disposed against the sides of the seat plate 11. The upper box 22 also has a top 23 in which a cup 24 is formed. In some embodiments, the upper box has a top 23 with no cup 24. The cup 24 is a truncated cone, having a wide base 25 formed integrally to the top 23 of the upper box 22 which tapers to a narrower open mouth 26. The cup 24 is a mount for the quick-release device 10 to receive, hold, and secure the rod 13 of the gas cylinder 12. The gas cylinder 12 is placed into the device 10 at the cup 24 and becomes seated therein during use of the chair.

Figure 3:
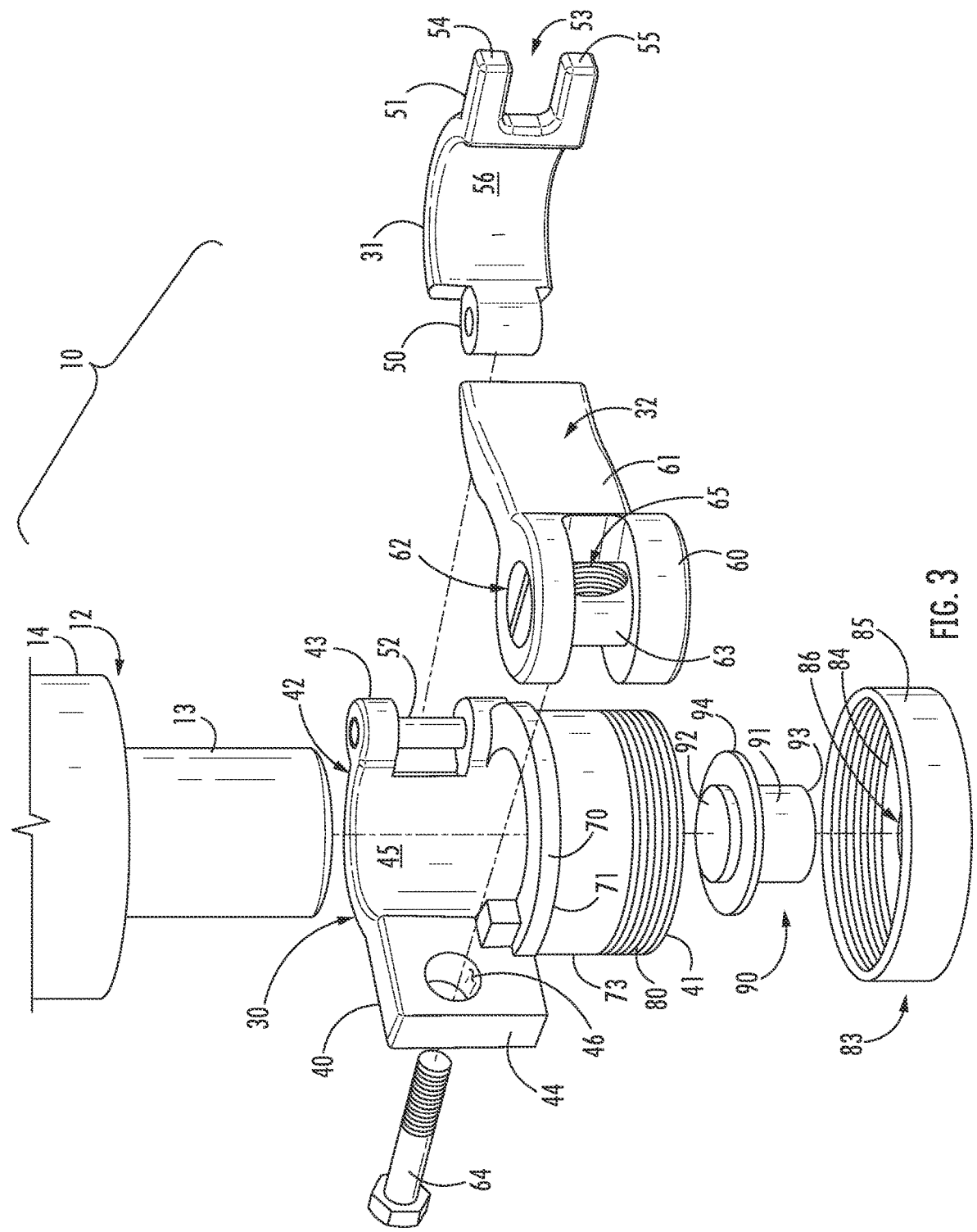
FIG. 3 is an exploded view of the quick-release device of FIG. 1.
Figure 4:
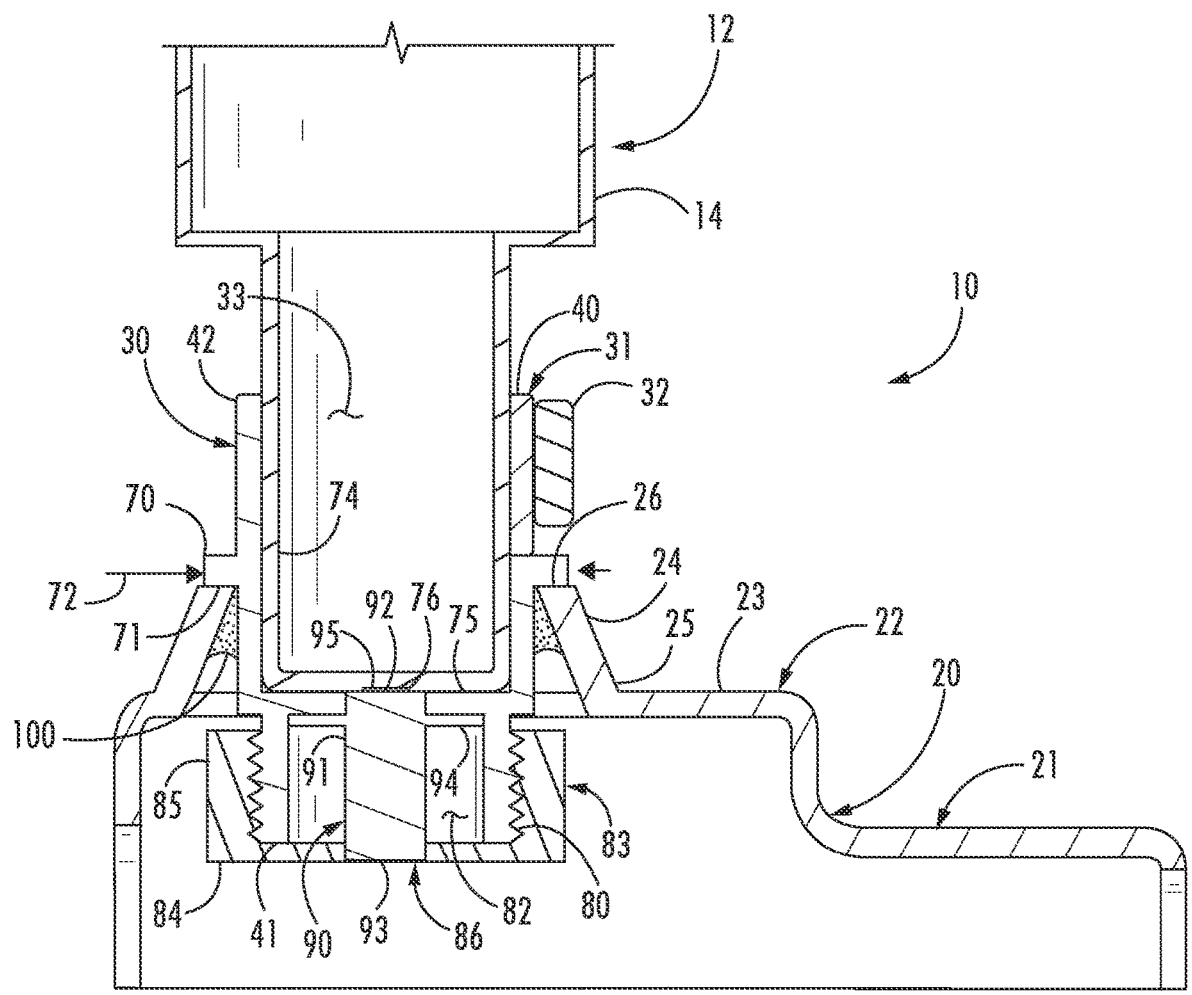
FIG. 4 is a section view taken along the line 4-4 of FIG. 2B.

Referring now primarily to FIGS. 3 and 4, the quick-release device 10 is a clamp having jaws useful for clamping onto the gas cylinder 12. The device 10 includes a roughly cylindrically-shaped pedestal 30, a clamp 31 pivoted to the pedestal 30 at a hinge 34, and a latch 32 secured over the clamp 31. The pedestal 30 and the clamp 31 are jaws, and the clamp 31 moves between closed and option conditions of the device 10. In the closed position of the clamp 31—and thus the closed condition of the quick-release device 10—the pedestal 30 and the clamp 31 bound and define an interior space or socket 33 into which the gas cylinder 12 is placed. The latch 32 mounted to the pedestal 30 to releasably couple, close, and tighten the clamp 31 with respect to the pedestal 30, so as to arrange the quick-release device 10 between the unlocked and locked conditions.

The pedestal 30 includes a top end 40 and an opposed bottom end 41. Again, the reader is reminded that these directional terms are used with respect to the orientation shown in the drawings, which are inverted from the orientation in which the chair and the device 10 are actually used. The top end 40 may be considered a first end and the bottom end 41 a second end. Proximate the top end 40, the pedestal 30 includes a jaw 42. The jaw 42 has a roughly semi-cylindrical sidewall with opposed ends 43 and 44. The end 43 is a knuckle forming a portion of the hinge 34. The opposed end 44 is flat, having a medial hole 46 extending longitudinally through the end 44.

The jaw 42 includes an inner surface 45 which is arcuate and defines an inner diameter of the jaw 42. The inner diameter of the jaw 42 is just slightly less than the outer diameter of the rod 13. As such, when the quick-release device 10 is moved into the closed condition around the rod 13, the outer diameter of the rod 13 is tightly received in contact against the inner surface 45 of the jaw 42.

The clamp 31 is pivoted to the jaw 42. The clamp 31 has opposed ends 50 and 51. The end 50 is a knuckle forming the portion of the hinge 34 complemental to the knuckled end 44 of the jaw 42, and the end 51 is a free end. A pin 52 is passed through bores formed through the ends 43 and 50 to bind the knuckled ends 43 and 50 of the jaw 42 and the clamp 31 to each other and form the hinge 34.

The clamp 31 has a roughly semi-cylindrical sidewall extending from the end 50 to the end 51. The end 51 is forked, having a medial slot 53 extending longitudinally into the clamp 31. The slot 53 receives the latch 32 to close the clamp 31 to the jaw 42. The slot 53 severs the free end 51 into opposed upper and lower tangs 54 and 55. The clamp 31 includes an inner surface 56 which is arcuate and defines an inner diameter of the clamp 31. The inner diameter of the clamp 31 is just slightly less than the outer diameter of the rod 13. As such, when the quick-release device 10 is moved into the closed condition around the rod 13, the outer diameter of the rod 13 is tightly received in contact against the inner surface 56 of the clamp 31. Further, when the clamp 31 is in the closed position thereof, the tangs 54 and 55 confront or are brought close to the end 44 of the jaw 42.

The clamp 31 is secured by the latch 32 coupled to the jaw 42. The latch 32 includes a cam 60 and a handle 61 formed integrally and monolithically to the cam 60, but extending away from the cam 60. The cam 60 and handle 61 together define the latch 32. The cam 60 is formed with a bore 62 extending entirely through the cam 60 transverse to the handle 61. The bore 62 holds a pin 63, about which the cam 60 and handle 61 are mounted for rotation. The bore 62 is eccentrically disposed in the cam 60; that is, the bore 62 is offset with respect to the geometric center of the cam 60.

The pin 63 has a threaded hole 65 to which the end of a bolt 64 is mounted with a threaded engagement. The bolt 64 is passed through the hole 46 in the end 44 of the jaw 42 and is prevented from passing through the hole 46 in a forward direction by an enlarged head of the bolt 64. The pin 63 can be rotated in one direction or another to thread the pin 63 more or less onto the bolt 64 and thereby translate the pin 63 down or up the bolt 64 slightly, so as to change the effective length of the bolt 64 slightly. With the pin 63 mounted on the bolt 64, the cam 60 and the handle 61 pivot with respect to the bolt 64 through a wide range of movement.

Because the bore 62 of the cam 60 is eccentrically formed, the cam 60 itself is an eccentric: as the handle 61 is rotated about the pin 63, the cam presents 60 a lesser or greater wall thickness along the direction of the bolt 64. In other words, as the handle 61 rotates, pin 63 is moved slightly closer to or further from the pin 63, shortening an effective length of the bolt 64 with which the clamp 31 can be captured. When the clamp 31 is in the closed position, the bolt 64 is passed through the slot 53 between the tangs 54 and 55 and is captured therein.

The above describes the structure for capturing and securing the gas cylinder 12 with respect to the pedestal 30. The pedestal 30 further includes structure which secures the pedestal 30 with respect to the seat plate. Referring to FIGS. 3 and 4, the jaw 42 of the pedestal 30 is a backstop projecting upwardly from a flange 70. The flange 70 has a lower surface 71 and an outer diameter 72 which is greater than the outer diameter of the remainder of the pedestal 30. A stem 73 depends below the flange 70. The stem 73 has a cylindrical sidewall 74 which has the same inner diameter defined by the jaw 42; the length of the sidewall 74 can vary depending on the size of the base 20. The sidewall 74 extends upward past the flange to define the jaw 42, and the inner diameter of the pedestal 30 is constant from the jaw 42 to the bottom of the stem 73. The stem 73 has an outer diameter which is less than the outer diameter 72 of the flange 70, such that the stem 73 is reduced with respect to the flange 70. Therefore, the lower surface 71 of the flange defines an abutment surface against which the pedestal 30 is received by the cup 24 of the base 20.

The stem 73 terminates at an endwall 75 toward the bottom end 41 of the pedestal 30. The endwall 75 is directed laterally, approximately ninety degrees with respect to the sidewall 74, extending radially inward to a central hole 76. The central hole 76 is a throughbore in the endwall 75 at or near the geometric center of the endwall 75. The endwall 75, and the central hole 76 formed therein, prevents the rod 13 from fully seating in the device 10, so that a pin 95 on the gas cylinder 12 will continue to operate, as described below.

Depending from the endwall 75 is a collar 80. The collar 80 is an annular sidewall projecting downward from the endwall 75 to the bottom end 41 of the pedestal 30, where it terminates at a bottom 81. The bottom 81, the collar 80, and the endwall 75 cooperate to bound and define a hold 82 within the collar 80. The collar 80 has externally-directed threads on the outer surface of the collar 80, to which a cap 83 engages.

The cap 83 is threadably engaged over the collar 80 to nearly enclose the hold 82. The cap 83 includes an endwall 84 and an annular upstanding sidewall 85 projecting above the endwall 84. A central hole 86 is formed at or near the geometric center of the endwall 84. The inner surface of the sidewall 85 carries internally-directed threads which are complemental to the threads on the collar 80. The cap 83 thus may be threadably engaged to and removed from the collar 80.

A button 90 is carried within the hold 82. The button 90 is an extension to engage the gas cylinder 12. The button 90 includes a central cylindrical shank 91 with opposed upper and lower ends 92 and 93. A thin flange 94 projects radially outward from the shank 91 proximate the upper end 92 thereof. The flange 94 has an outer diameter corresponding to the inner diameter of the collar 80, such that button 90 fits snugly within the collar 80. The upper end 92 of the button 90 is cylindrical and has an outer diameter corresponding to the central hole 76 in the endwall 75 of the stem 73, such that the upper end 92 is sized and shaped to translate into and out of the central hole 76. Likewise, the lower end 93 of the button 90 is cylindrical and has an outer diameter corresponding to the central hole 86 in the endwall 84 of the cap 83, such that the lower end 93 is sized and shaped to translate into and out of the central hole 86. The button 90 is thus carried in the hold 82 for reciprocation between an advanced position and a retracted position. In some embodiments, the flange 94 may be thicker or there may be a second flange to prevent the button 90 from tilting within the collar 80 during reciprocation. In the retracted position, the lower end 93 passes through and projects out of the central hole 86 in the endwall 84 of the cap 83, where it is available to be depressed by a lever 96 (shown in FIG. 2A). The lever 96 projects over to the side of the chair so that it can be grabbed by the chair's user and manipulated to alter the height of the seat. When the lever 96 is pressed against the lower end 93 of the button 90, the button 90 translates upward and the upper end 92 projects through the central hole 76 in the endwall 75 of the stem 73. Gas cylinders similar to the gas cylinder 12 often include a button or pin 95 at the end of the rod 13 which enables and disables translation of the rod 13 within the sleeve 14. When the button 90 translates upward it impacts the pin 95, so that the rod 13 may be moved within the sleeve 14. Therefore, the button 90 acts as an extension to the pin 95 to enable and disable translation of the rod 13.

In operation, the quick-release device 10 is useful to securely secure the gas cylinder 12 with respect to the cup 24. The quick-release device 10 can be opened to remove the gas cylinder 12 from the cup 24 when the chair, table, or furniture item is ready to be packed up and transported. FIGS. 1-4 illustrate the device 10 in a closed condition. The following discussion describing how to remove the quick-release device 10 is made with respect to FIGS. 2B, 4, and 5A-5C.

FIGS. 2B and 4 show the pedestal 30 applied to the cup 24. The pedestal 30 is partially inserted into the base 20 through the open mouth 26 of the cup 24. The pedestal 30 is disposed in confronting relation with the cup 24, with the lower surface 71 of the flange 70 in confrontation with the mouth 26 of the cup 24, thereby firmly seating the pedestal 30 in the cup 24. So seated, the stem 73 extends into the base 20 and is encircled by the cup 24, and the collar 80 projects into the upper box 22 and slightly into the lower box 21 of the base 20. When the cap 83 is threadably engaged to the collar 80, the pedestal 30 cannot be removed from the base 20; the outer diameter of the cap 83 is larger than the inner diameter of the open mouth 26 of the cup 24. The pedestal 30 is secured in the cup by a weld 100 between the inner surface of the cup 24 and the outer surface of the sidewall 74 of the stem 73. The weld 100 is shown in FIG. 4.

Preferably, during the assembly and installation process, the pedestal 30 is inserted through the open mouth 26 of the cup 24 until the flange 70, which has an outer diameter 72 larger than the open mouth 26, confronts the mouth 26 and prevents further insertion of the pedestal 30 into the cup 24. A welder then forms the weld 100 between the cup 24 and the stem 73 to secure the pedestal 30 in the base. Then, the button 90 is applied to the hold 82 within the collar 80, and the cap 83 is threadably engaged to the collar 80.

FIG. 2B shows the latch 32 and the quick-release device 10 in the closed condition. The handle 61 of the latch 32 is directed along the outer surface of the clamp 31. In this position of the handle 61, the cam 60 pushes the tangs 54 and 55 of the clamp 31 toward the end 44 of the jaw 42. Because the jaw 42 is fixed as part of the pedestal 30, and because the clamp 31 pivots with respect to the jaw 42 about the hinge 34, placing the handle 61 into the closed position moves the clamp 31 toward the jaw 42. Again, this is because the cam 60 is an eccentric: as the handle 61 is moved into the closed position, the cam 60 rotates to present a greater wall thickness along the direction of the bolt 64. This shortens the effective length of the bolt 64, that is, the length of the bolt 64 from the end 44 of the jaw 42 onto which the free end 51 of the clamp 31 can be fit. This draws the clamp 31 closer to the jaw 42, thereby constricting the quick-release device 10 about the rod 13 of the gas cylinder 12. Because the jaw 42 and clamp 31 have inner diameters just slightly less than the outer diameter of the rod 13, this clamps the gas cylinder 12 tightly into the device 10. With the pedestal 30 secured by the weld 100 to the base 20, and the rod 13 secured by the quick-release device 10 to the pedestal 30, the gas cylinder 12 is firmly secured in the seat plate 11.

To remove the gas cylinder 12 from the seat plate 11, the chair, table, or furniture item is inverted. Then, and with reference to FIG. 5A, the handle 61 is taken up, such as by hand, and moved away from the clamp 31, along the pivotal direction of the arcuate arrowed line A in FIG. 5A. Pivoting the handle 61 about the pin 63 at the end of the bolt 64 allows the tangs 54 and 55 at the end 51 of the clamp 31 to move slightly away from the end 44 of the jaw 42. This loosens the jaw 42 and the clamp 31 with respect to the rod 13. The handle 61 is moved until it is at least aligned with the bolt 64. At this position of the handle 61, the latch 32 can be rotated on the threaded end of the bolt 64.

Figure 5A:
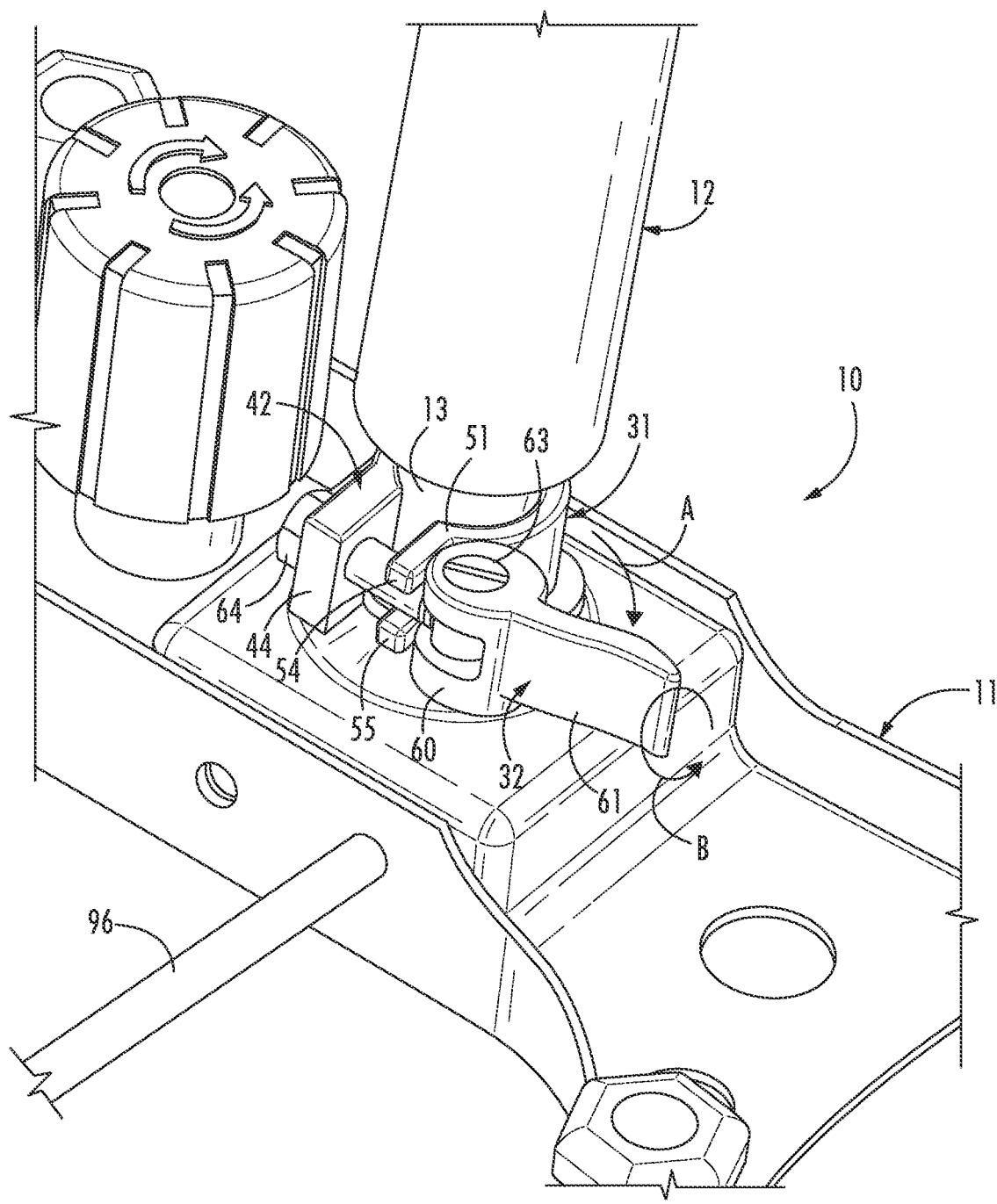
FIGS. 5A-5C are perspective views showing steps of removing the gas cylinder assembly from the quick-release device of FIG. 1.

The latch 32 is rotated counter-clockwise along the circular line B in FIG. 5A (or the bolt 64 is rotated clockwise while the latch 32 is held stationary), causing the pin 63 in the cam 60 to threadably disengage from the threaded end of the bolt 64. This increases the effective length of the bolt 64 and allows the clamp 31 to move further away from the jaw 42. The latch 32 is loosened until the clamp 31 can be swung out; in some cases this may require that the latch 32 be completely removed from the bolt 64. In other embodiments, the bolt 64 is pivoted within the end 44 of the clamp 31, and can be pivoted away from the rod 13 to move the latch 32. In still other embodiments, it is only necessary to swing the latch 32 out along line 32 to release the compression of the jaw 42 against the rod 13, and it is not necessary to loosen the latch 32 by spinning it.

Figure 5B:
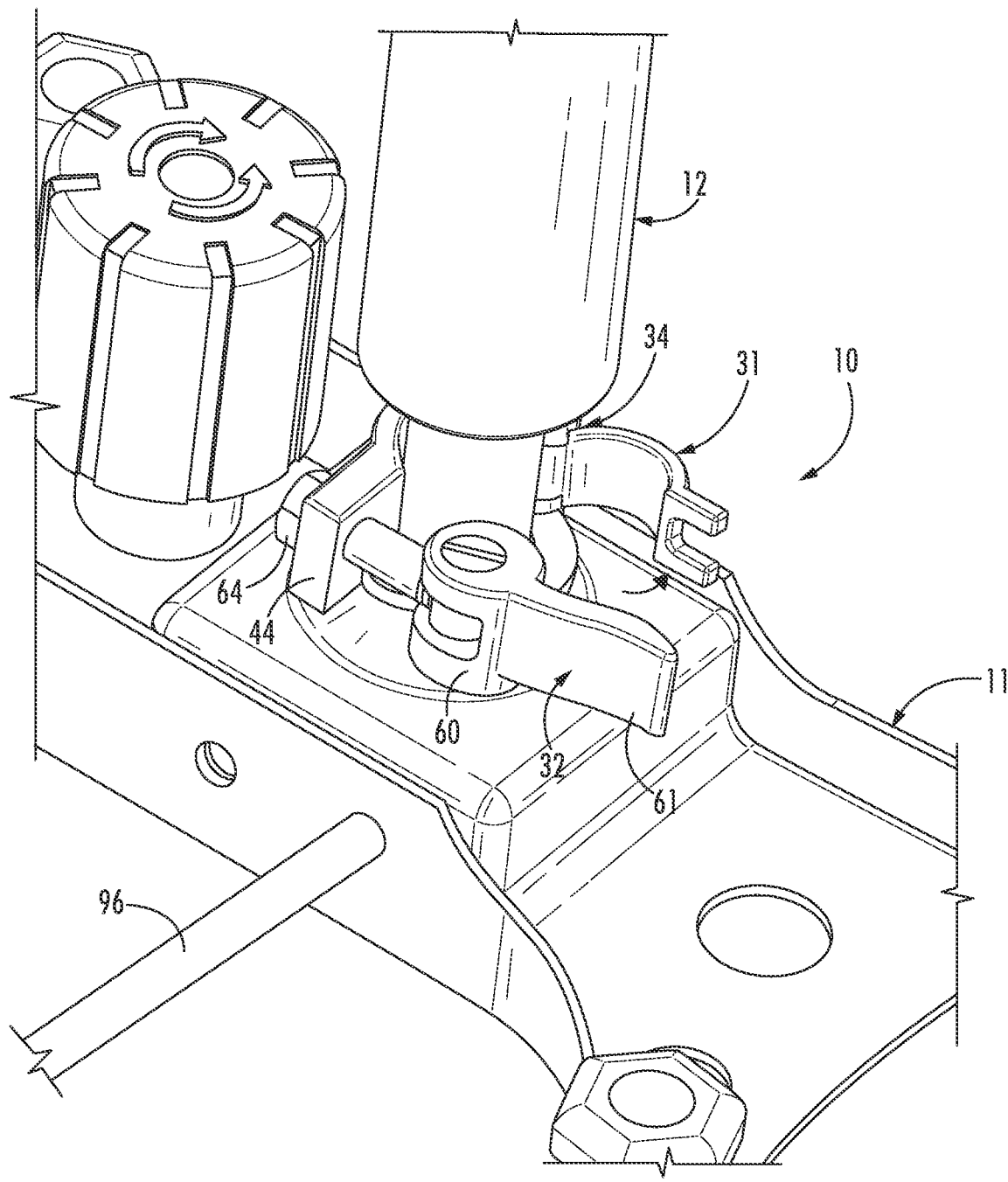

Once the latch 32 is sufficiently loosened from the bolt 64, the clamp 31 can be swung out, pivoted about the hinge 34 along the arcuate arrowed line C in FIG. 5B. The clamp 31 is swung out sufficiently so that it is well away from the rod 13. This releases all compression on the rod 13. In other embodiments, simply moving the latch 32 into the open position is sufficient to release the compression on the rod 13, and it is not necessary to swing the clamp 31 out.

Figure 5C:
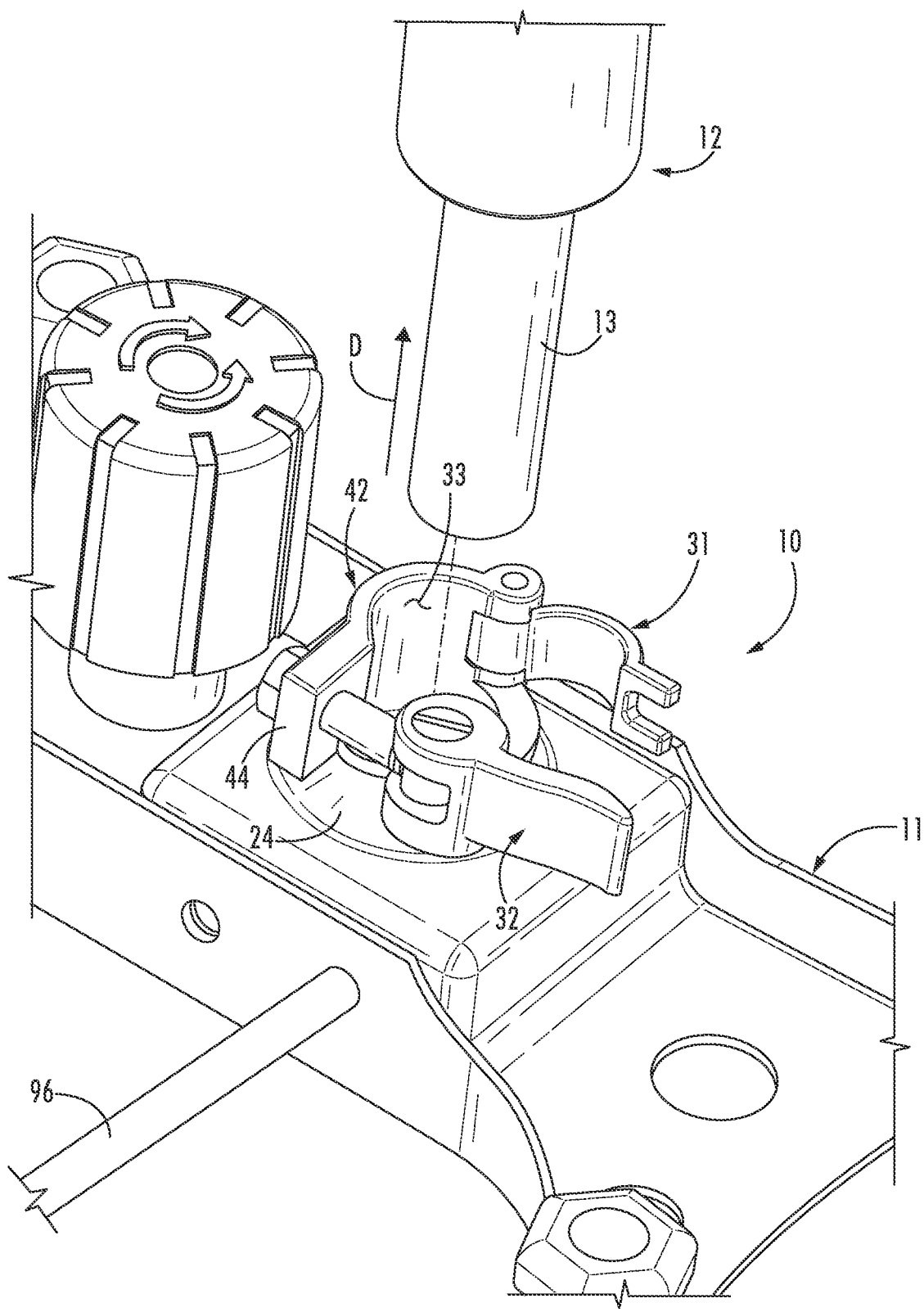

Finally, the entire gas cylinder 12 can be pulled away from the socket 33, along the line D in FIG. 5C. The gas cylinder 12 is now entirely decoupled from the seat plate 11 so that the chair can be stored separately from the gas cylinder 12 and wheelbase 15.

The pieces of the chair may then be packed and stored or shipped. When the chair is to be re-assembled on site, the steps above are mostly reversed. The gas cylinder 12 is inserted into the socket 33, the chair is preferably returned to its upright position so that the weight of the chair bears the rod 13 of the gas cylinder 12 into the seat plate 11. The clamp 31 of the quick-release device 10 is closed around the rod 13. The latch 32 is then tightened onto the bolt 64, bringing the handle 61 over the end 51 of the clamp 31, and moving the tangs 54 and 55 toward the end 44 of the jaw 42.

The handle 61 is moved to the closed position thereof, against the outside of the clamp 31. This tightens the quick-release device 10 about the rod 13. If the quick-release device 10 is too tight or not sufficiently tight, the handle 61 can be opened and spun (or the bolt 64 is spun); this causes the pin 63 to thread in or out on the bolt 64 and will change the tightness of the quick-release device 10 on the gas cylinder 12.

Figure 6:
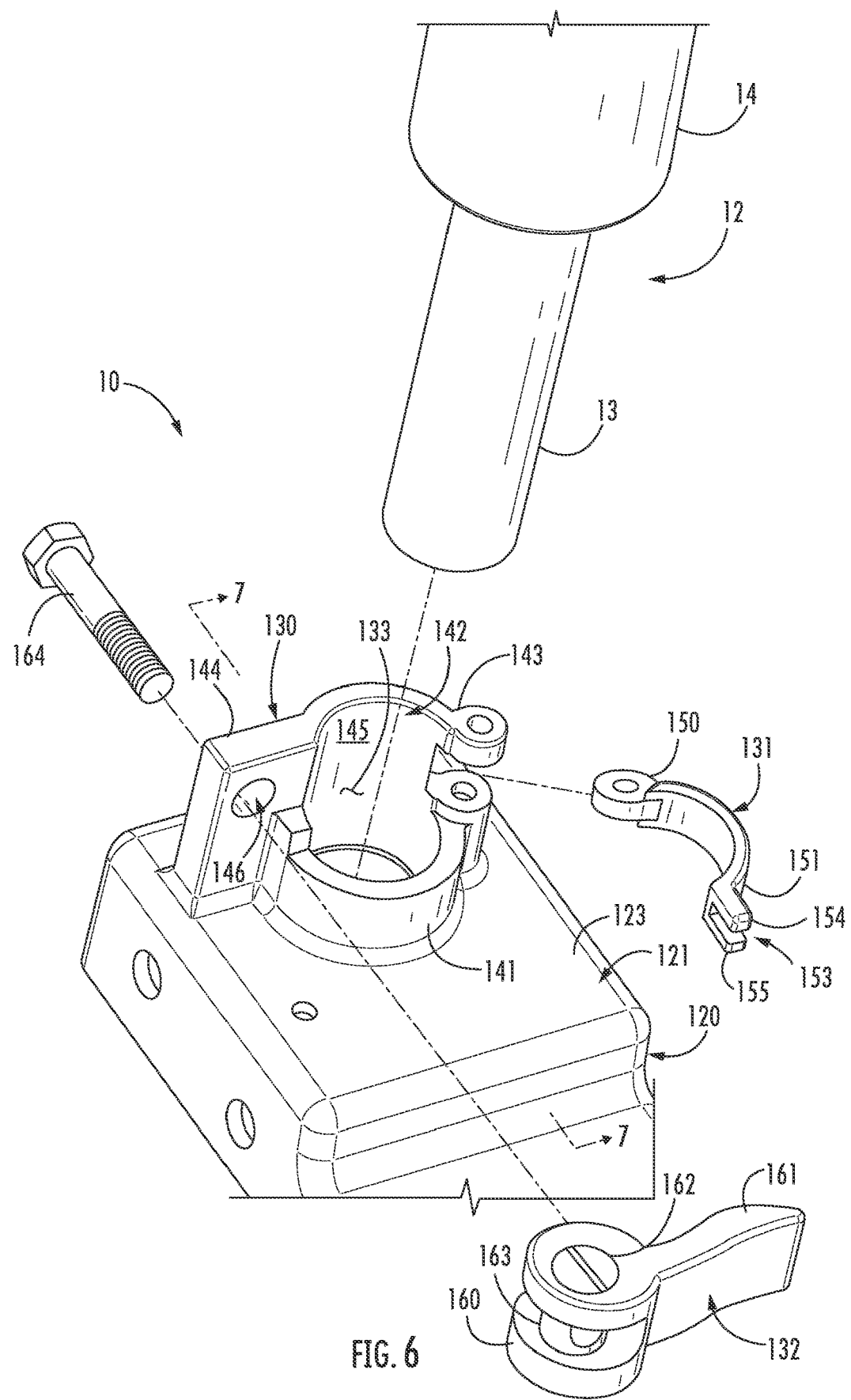
FIG. 6 is an inverted, bottom perspective view of an embodiment of a quick-release device with a gas cylinder assembly.

FIG. 6 is an exploded view of a quick-release device 110 (also referred to herein simply as "the device 110") which can be secured to a seat plate 11 of chair of the kind shown in FIG. 1. In FIG. 6, the seat bottom and back of the chair are removed, as is the seat plate 11, for clarity of the illustration. As before, the remainder of this specification describes a chair for convenience of the explanation, but a chair is just one exemplary device on which the device 110 is suitable for use; it can also be used with any device which incorporates a gas cylinder similar to the gas cylinder 12. The device 110 is similar in many ways to the device 10.

A base 120 is carried within the seat plate 11. Referring now also to the section view of FIG. 7, the base 120 is generally box-shaped; it includes a lower box 121 and a smaller upper box 122. Both the upper and lower boxes 121 and 122 have fronts and backs, and sides which may be disposed against the sides of the seat plate 11. The upper box 122 also has a generally flat top 123.

The quick-release device 110 is a clamp having jaws useful for clamping onto the gas cylinder 12. The device 110 includes a roughly cylindrically-shaped pedestal 130, a clamp 131 pivoted to the pedestal 130 at a hinge 134, and a latch 132 secured over the clamp 131. The pedestal 130 and the clamp 131 are jaws, and the clamp 131 moves between closed and option conditions of the device 110. In the closed position of the clamp 131—and thus the closed condition of the quick-release device 110—the pedestal 130 and the clamp 131 bound and define an interior space or socket 133 into which the gas cylinder 12 is placed. The latch 132 mounted to the pedestal 130 to releasably couple, close, and tighten the clamp 131 with respect to the pedestal 130, so as to arrange the quick-release device 110 between the unlocked and locked conditions.

The pedestal 130 projects upwardly from the top 123 of the base 120 to a top end 140 of the pedestal 130. The top end 140 may be considered a first end and the bottom end of the pedestal 130, formed to the top 123, may be considered a second end. Proximate the top end 140, the pedestal 130 includes a jaw 142. The jaw 142 has a roughly semi-cylindrical sidewall with opposed ends 143 and 144. The end 143 is a knuckle forming a portion of the hinge 134. The opposed end 144 is flat, having a medial hole 146 extending longitudinally through the end 144. Below the jaw 142 is a short stem or cylinder 141, extending completely around and defining the lower portion of the socket 133. The cylinder 141 is below jaw 142 and opposite from the jaw 142, below the clamp 131. The cylinder 141 is the base of the pedestal 130 and is formed monolithically and integrally to the top 123. The cylinder 141 encircles a central hole 147 formed in the top 123, at the geometric center of the cylinder 141 on the top 123. The central hole 147 is registered with a pin 148 on the gas cylinder 12 which enables and disables translation of the rod 13 within the sleeve 14.

The jaw 142 includes an inner surface 145 which is arcuate and defines an inner diameter of the jaw 142. The inner diameter of the jaw 142 is just slightly less than the outer diameter of the rod 13. The inner diameter of the cylinder 141 corresponds to the outer diameter of the rod 13. As such, when the quick-release device 110 is moved into the closed condition around the rod 13, the outer diameter of the rod 13 is tightly received in contact against the inner surface 145 of the jaw 142.

The clamp 131 is pivoted to the jaw 142. The clamp 131 has opposed ends 150 and 151. The end 150 is a knuckle forming the portion of the hinge 134 complemental to the knuckled end 144 of the jaw 142, and the end 151 is a free end. A pin 152 is passed through bores formed through the ends 143 and 150 to bind the knuckled ends 143 and 150 of the jaw 142 and the clamp 131 to each other and form the hinge 134.

The clamp 131 has a roughly semi-cylindrical sidewall extending from the end 150 to the end 151. The end 151 is forked, having a medial slot 153 extending longitudinally into the clamp 131. The slot 153 receives the latch 132 to close the clamp 131 to the jaw 142. The slot 153 severs the free end 151 into opposed upper and lower tangs 154 and 155. The clamp 131 includes an inner surface 56 which is arcuate and defines an inner diameter of the clamp 131. The inner diameter of the clamp 131 is just slightly smaller than the outer diameter of the rod 13. As such, when the quick-release device 110 is moved into the closed condition around the rod 13, the outer diameter of the rod 13 is tightly received in contact against the inner surface 56 of the clamp 131. Further, when the clamp 131 is in the closed position thereof, the tangs 154 and 155 confront or are brought close to the end 144 of the jaw 142.

The clamp 131 is secured by the latch 132 coupled to the jaw 142. The latch 132 includes a cam 160 and a handle 161 formed integrally and monolithically to the cam 160, but extending away from the cam 160. The cam 160 and handle 161 together define the latch 132. The cam 160 is formed with a bore 162 extending entirely through the cam 160 transverse to the handle 161. The bore 162 holds a pin 163, about which the cam 160 and handle 161 are mounted for rotation. The bore 162 is eccentrically disposed in the cam 160; that is, the bore 162 is offset with respect to the geometric center of the cam 160.

The pin 163 has a threaded hole 65 to which the end of a bolt 164 is mounted with a threaded engagement. The bolt 164 is passed through the hole 146 in the end 144 of the jaw 142 and is prevented from passing through the hole 146 in a forward direction by an enlarged head of the bolt 164. The pin 163 can be rotated in one direction or another to thread the pin 163 more or less onto the bolt 164 and thereby translate the pin 163 down or up the bolt 164 slightly, so as to change the effective length of the bolt 164 slightly. With the pin 163 mounted on the bolt 164, the cam 160 and the handle 161 pivot with respect to the bolt 164 through a wide range of movement.

Because the bore 162 of the cam 160 is eccentrically formed, the cam 160 itself is an eccentric: as the handle 161 is rotated about the pin 163, the cam presents 160 a lesser or greater wall thickness along the direction of the bolt 164. In other words, as the handle 161 rotates, pin 163 is moved slightly closer to or further from the pin 163, shortening an effective length of the bolt 164 with which the clamp 131 can be captured. When the clamp 131 is in the closed position, the bolt 164 is passed through the slot 153 between the tangs 154 and 155 and is captured therein.

The base 120 has an underside 124. A cap 183 is secured in the underside 124 below the pedestal 130. A channel 1187 is formed into the underside 124, and the cap 183 is snug fit into the channel 1187 and preferably welded, adhered, or otherwise fixed and secured in the channel 1187. The cap 183 includes an endwall 184 and an annular upstanding sidewall 185 projecting above the endwall 184. A central hole 186 is formed at or near the geometric center of the endwall 184. The top of the sidewall 185 is secured in the channel 1187. The underside 124 and the sidewall 185 and endwall 184 of the cap 183 cooperate to define a hold 187 within the cap 183.

A button 190 is carried within the hold 187. The button 190 is an extension to engage the gas cylinder 12. The button 190 includes a central cylindrical shank 191 with opposed upper and lower ends 192 and 193. A thin flange 194 projects radially outward from the shank 191 at the upper end 192 thereof. The flange 194 has an outer diameter corresponding to the inner diameter of the central hole 147, such that button 190 fits snugly within the central hole 147. Likewise, the lower end 193 of the button 190 is cylindrical and has an outer diameter corresponding to the central hole 186 in the endwall 184 of the cap 183, such that the lower end 193 is sized and shaped to translate into and out of the central hole 186. The button 190 is thus carried in the hold 187 for reciprocation between an advanced position and a retracted position. In some embodiments, the flange 194 may be thicker or there may be a second flange to prevent the button 190 from tilting within the collar 80 during reciprocation. In the retracted position, the lower end 193 passes through and projects out of the central hole 186 in the endwall 184 of the cap 183, where it is available to be depressed by a lever 96 (shown in FIG. 8A). The lever 96 projects over to the side of the chair so that it can be grabbed by the chair's user and manipulated to alter the height of the seat. When the lever 96 is pressed against the lower end 193 of the button 190, the button 190 translates upward and the upper end 192 projects through the central hole 147 in the top 123 of the base 120. Gas cylinders similar to the gas cylinder 12 often include a button or pin 195 at the end of the rod 13 which enables and disables translation of the rod 13 within the sleeve 14. When the button 190 translates upward it impacts the pin 195, so that the rod 13 may be moved within the sleeve 14. Therefore, the button 190 acts as an extension to the pin 195 to enable and disable translation of the rod 13.

Figure 7:
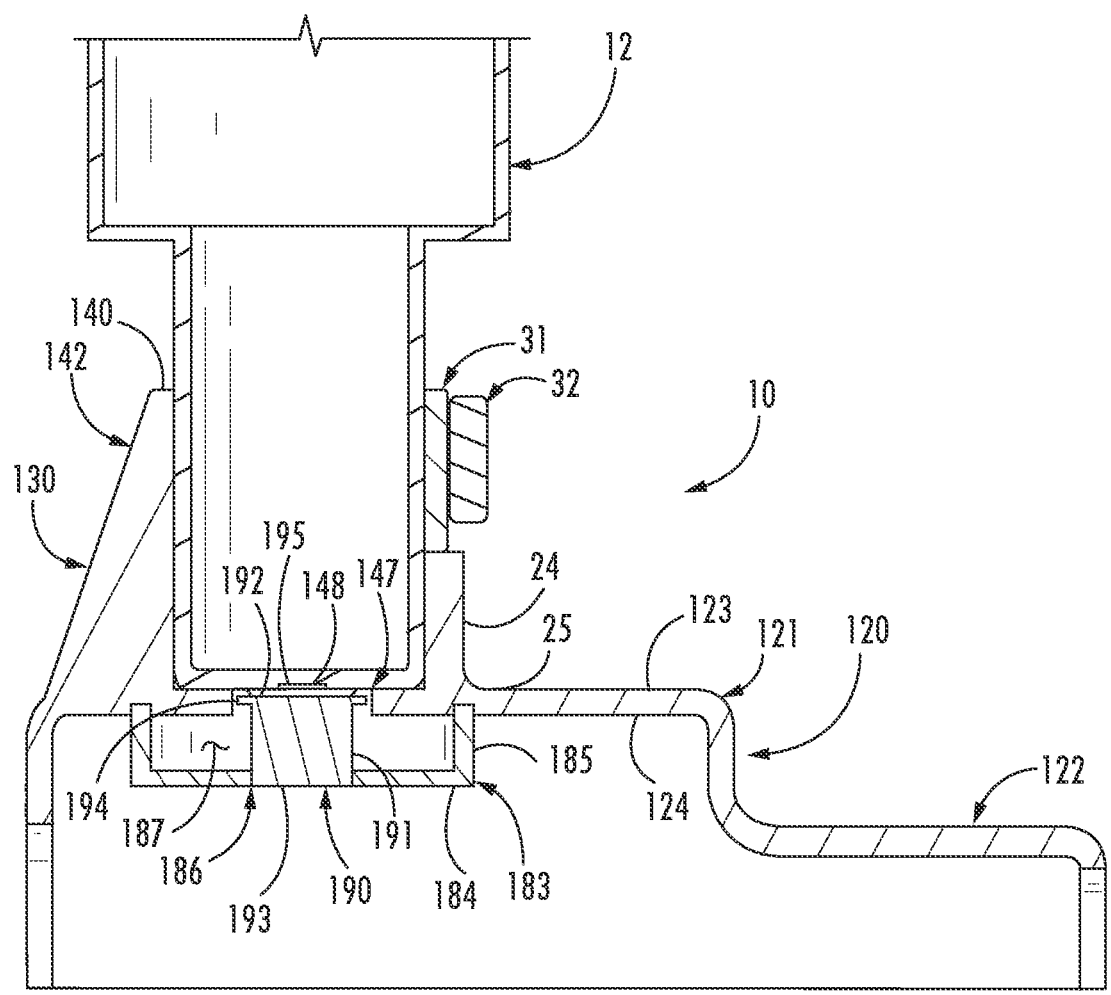
FIG. 7 is a section view taken along the line 7-7 in FIG. 6.

In operation, the quick-release device 110 is useful to securely secure the gas cylinder 12 with respect to the socket 133. The quick-release device 110 can be opened to remove the gas cylinder 12 from the socket 133 when the chair, table, or furniture item is ready to be packed up and transported. FIGS. 6 and 7 illustrate the device 110 in a closed condition. The following discussion describing how to remove the quick-release device 110 is made with respect to FIGS. 7-8C.

FIG. 7 shows the pedestal 130 applied to the socket 133, with the latch 132 and the quick-release device 110 in the closed condition. The handle 161 of the latch 132 is directed along the outer surface of the clamp 131. In this position of the handle 161, the cam 160 pushes the tangs 154 and 155 of the clamp 131 toward the end 144 of the jaw 142. Because the jaw 142 is fixed as part of the pedestal 130, and because the clamp 131 pivots with respect to the jaw 142 about the hinge 134, placing the handle 161 into the closed position moves the clamp 131 toward the jaw 142. Again, this is because the cam 160 is an eccentric: as the handle 161 is moved into the closed position, the cam 160 rotates to present a greater wall thickness along the direction of the bolt 164. This shortens the effective length of the bolt 164, that is, the length of the bolt 164 from the end 144 of the jaw 142 onto which the free end 151 of the clamp 131 can be fit. This draws the clamp 131 closer to the jaw 142, thereby constricting the quick-release device 110 about the rod 13 of the gas cylinder 12. Because the jaw 142 and clamp 131 have inner diameters just slightly less than the outer diameter of the rod 13, this clamps the gas cylinder 12 tightly into the device 110. With the pedestal 130 secured monolithically and integrally to the base 120, and the rod 13 secured by the quick-release device 110 to the pedestal 130, the gas cylinder 12 is firmly secured in the base 120.

To remove the gas cylinder 12 from the seat plate 11, the chair, table, or furniture item is inverted. Then, and with reference to FIG. 8A, the handle 161 is taken up, such as by hand, and moved away from the clamp 131, along the pivotal direction of the arcuate arrowed line A' in FIG. 8A. Pivoting the handle 161 about the pin 163 at the end of the bolt 164 allows the tangs 154 and 155 at the end 151 of the clamp 131 to move slightly away from the end 144 of the jaw 142. This loosens the jaw 142 and the clamp 131 with respect to the rod 13. The handle 161 is moved until it is at least aligned with the bolt 164. At this position of the handle 161, the latch 132 can be rotated on the threaded end of the bolt 164.

Figure 8A:
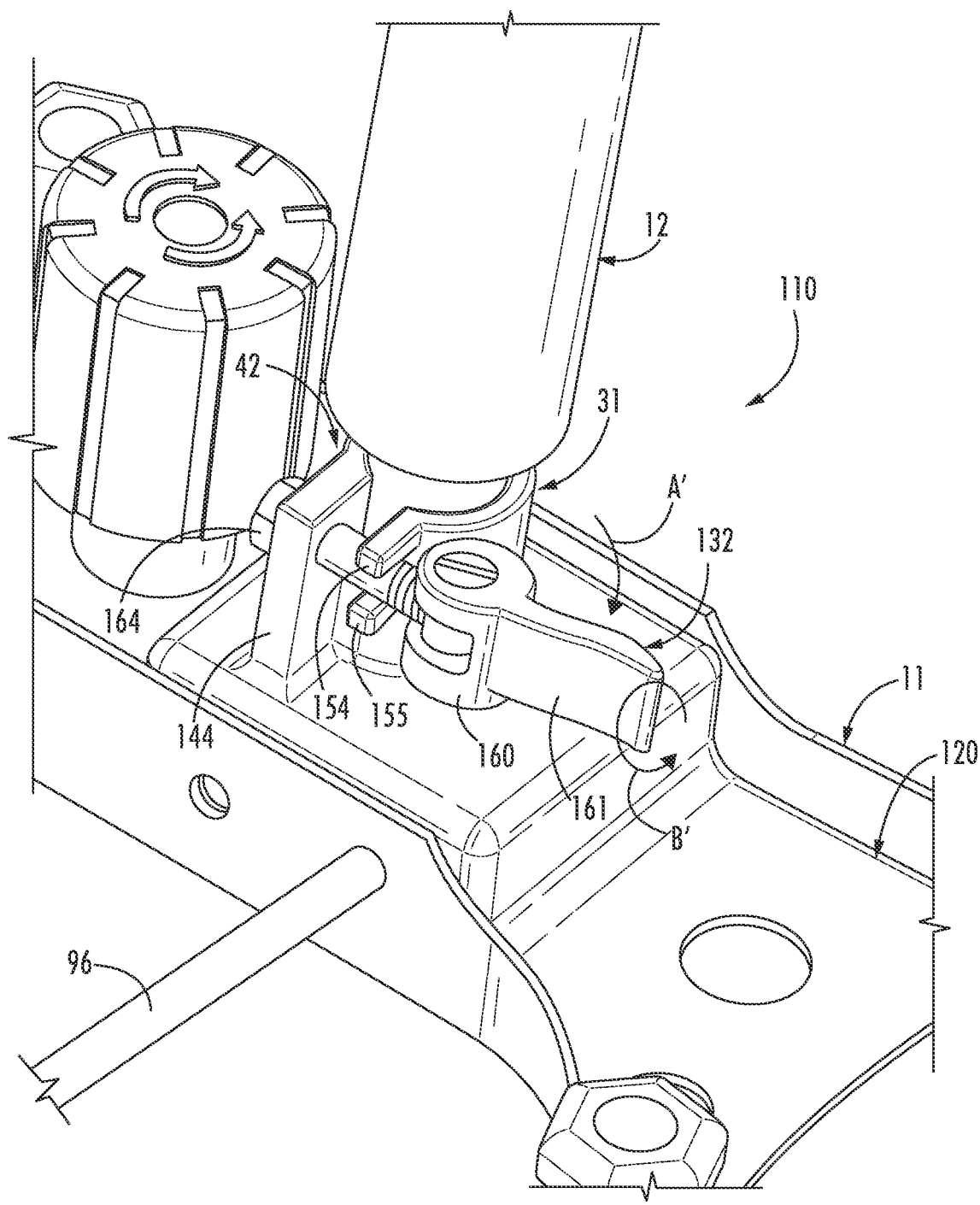
FIGS. 8A-8C are perspective views showing steps of removing the gas cylinder assembly from the quick-release device of FIG. 6.

The latch 132 is rotated counter-clockwise along the circular line B' in FIG. 8A (or the bolt 164 is rotated clockwise while the latch 132 is held stationary), causing the pin 163 in the cam 160 to threadably disengage from the threaded end of the bolt 164. This increases the effective length of the bolt 164 and allows the clamp 131 to move further away from the jaw 142. The latch 132 is loosened until the clamp 131 can be swung out; in some cases this may require that the latch 132 be completely removed from the bolt 164. In other embodiments, the bolt 164 is pivoted within the end 144 of the clamp 131 and can be pivoted away from the rod 13 to move the latch 132. In still other embodiments, it is only necessary to swing the latch 132 out along line 132 to release the compression of the jaw 42 against the rod 13, and it is not necessary to loosen the latch 132 by spinning it.

Figure 8B:
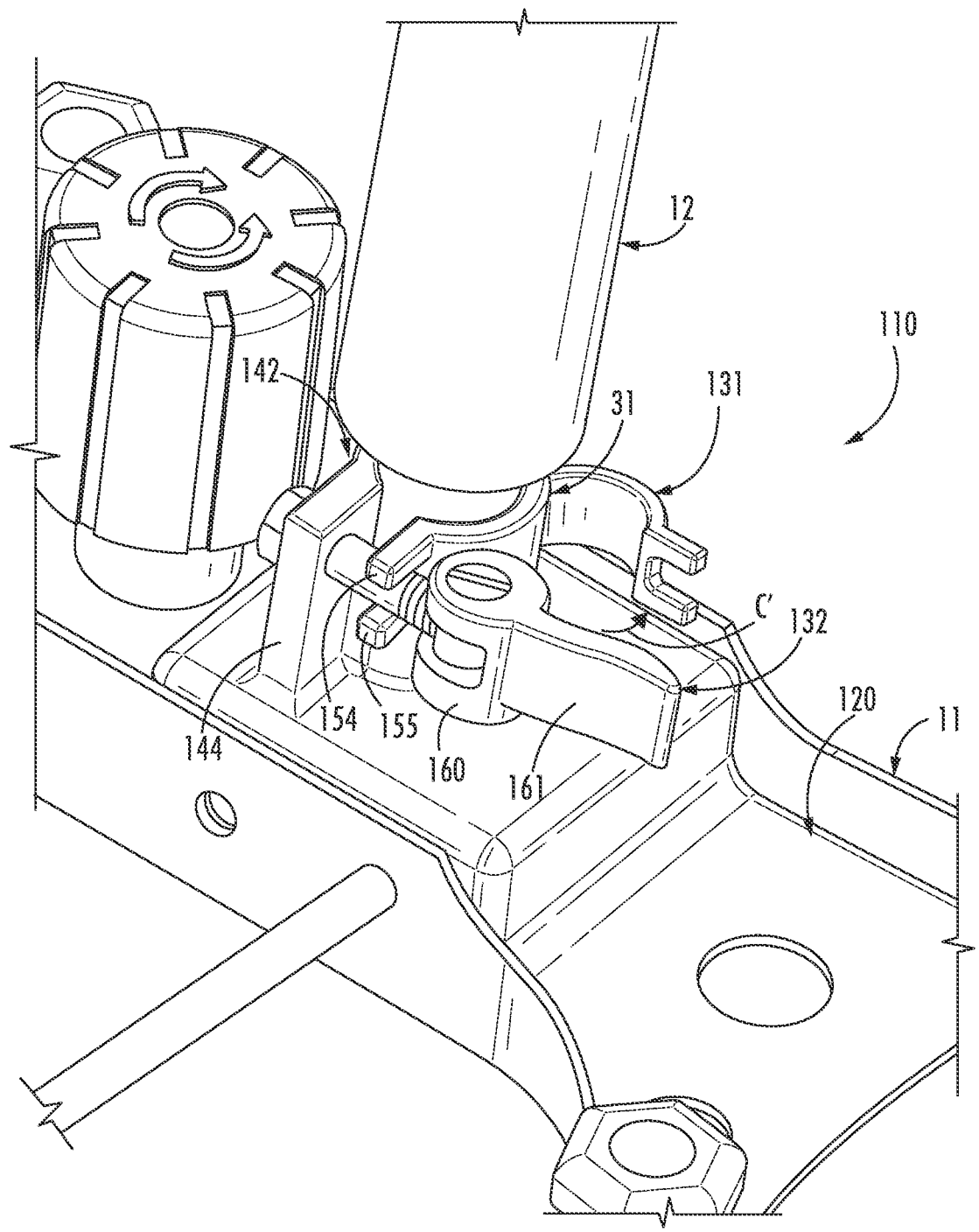

Once the latch 132 is sufficiently loosened from the bolt 164, the clamp 131 can be swung out, pivoted about the hinge 134 along the arcuate arrowed line C' in FIG. 8B (FIG. 8B shows both positions of the clamp 131, before and after it is swung out). The clamp 131 is swung out sufficiently so that it is well away from the rod 13. This releases all compression on the rod 13. In other embodiments, simply moving the latch 132 into the open position is sufficient to release the compression on the rod 13, and it is not necessary to swing the clamp 131 out.

Figure 8C:
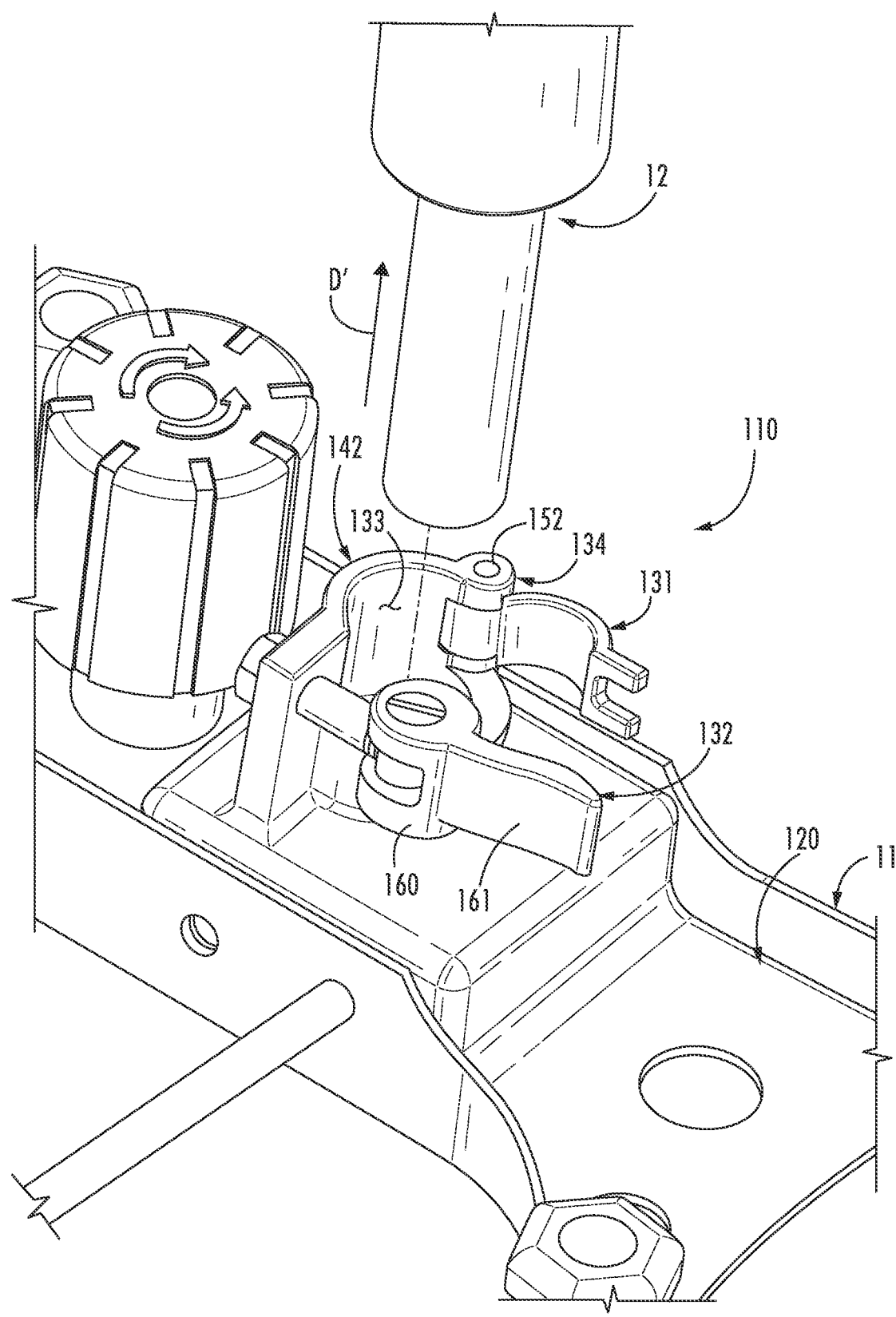

Finally, the entire gas cylinder 12 can be pulled away from the socket 133, along the line D' in FIG. 8C. The gas cylinder 12 is now entirely decoupled from the base 20 so that the chair can be stored separately from the gas cylinder 12 and wheelbase 15.

The pieces of the chair may then be packed and stored or shipped. When the chair is to be re-assembled on site, the steps above are mostly reversed. The gas cylinder 12 is inserted into the socket 133, the chair is preferably returned to its upright position so that the weight of the chair bears the rod 13 of the gas cylinder 12 into the seat plate 11. The clamp 131 of the quick-release device 110 is closed around the rod 13. The latch 132 is then tightened onto the bolt 164, bringing the handle 161 over the end 151 of the clamp 131, and moving the tangs 154 and 155 toward the end 144 of the jaw 142. The handle 161 is moved to the closed position thereof, against the outside of the clamp 131. This tightens the quick-release device 110 about the rod 13. If the quick-release device 110 is too tight or not sufficiently tight, the handle 161 can be opened and spun (or the bolt 164 is spun); this causes the pin 163 to thread in or out on the bolt 164 and will change the tightness of the quick-release device 110 on the gas cylinder 12.

Figure 9:
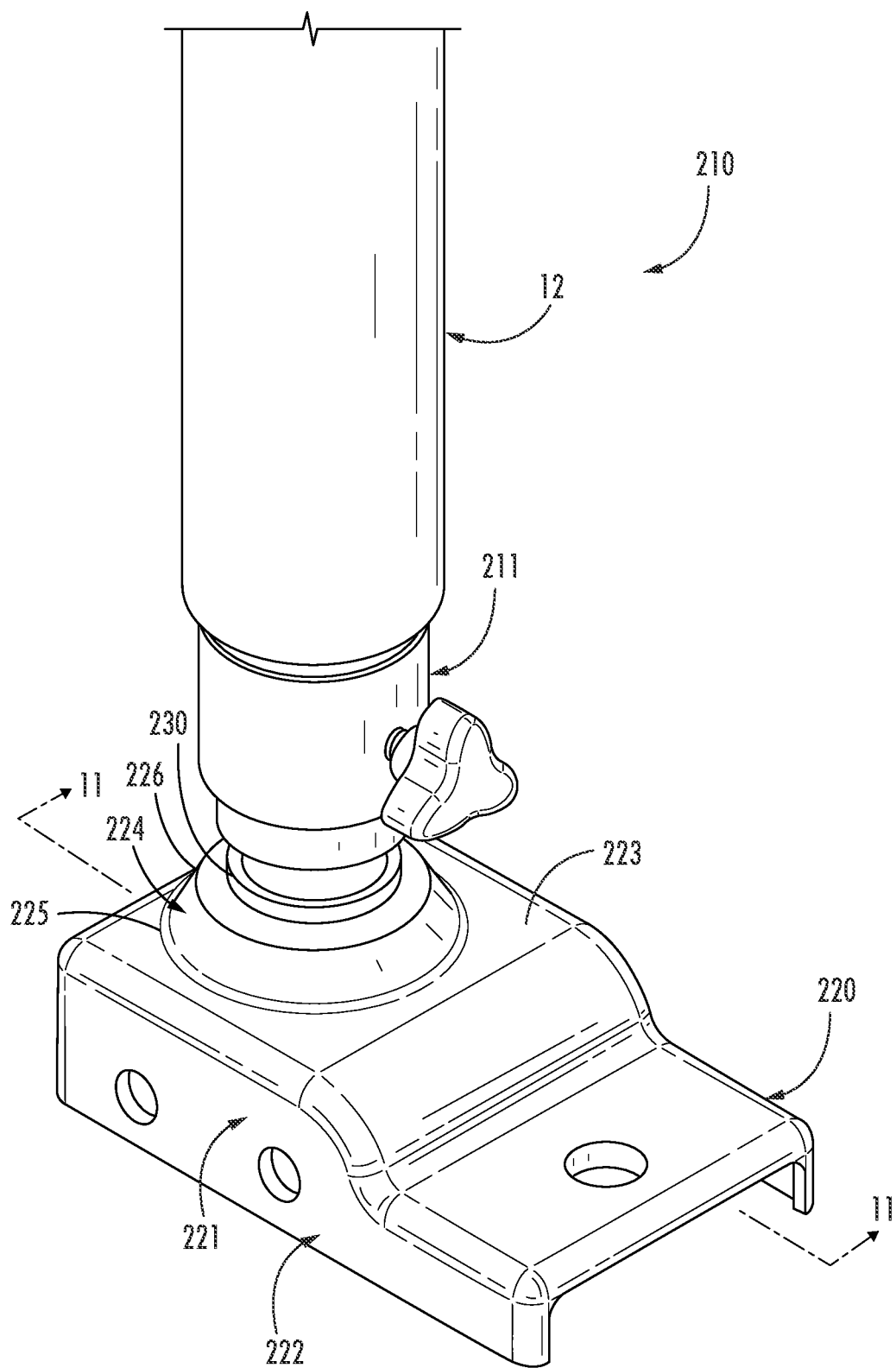
FIG. 9 is an inverted, bottom perspective view of an embodiment of a quick-release device with a gas cylinder assembly.

FIG. 9 is an exploded view of a quick-release device 210 (also referred to herein simply as "the device 210") which can be secured to a seat plate 11 of a chair of the kind shown in FIG. 1. The device 210 is universal: it can receive the rod of any gas cylinder for use with any seat plate or other receptable on other furniture or other items supported by gas cylinders. For this reason, although reference below is with respect to a seat plate 11 of a chair of the type shown in FIG. 1, the reader will understand that the device 210 is not so limited. In FIG. 9, the seat bottom and back of the chair are removed, as is the seat plate 11, for clarity of the illustration. As before, the remainder of this specification describes a chair for convenience of the explanation, but a chair is just one exemplary device on which the device 210 is suitable for use; it can also be used with any device which incorporates a gas cylinder similar to the gas cylinder 12. The device 210 is similar in many ways to the devices 10 and 110.

The device 210 includes a base 220 and an adapter 211 fixed in the base 220 for receiving the gas cylinder 12. The base 220 is carried within the seat plate 11. Referring now also to the section view of FIG. 11, the base 220 is generally box-shaped; it includes a lower box 221 and an upper box 222. Both the upper and lower boxes 221 and 222 have fronts and backs, and sides which may be disposed against the sides of the seat plate 11. The upper box 222 also has a generally flat top 223 to which a cup 224 is formed.

The cup 224 is a truncated cone, having a wide base 225 formed integrally to the flat top 223. The cup 224 tapers to a narrower top 226. A sleeve 230 is fixed to the cup 224 at the top 226. The sleeve 230 is a mount for the adapter 211, which receives, holds, and secures the rod 13 of the gas cylinder 12.

The sleeve 230 appears cylindrical but is actually slightly tapered in the nature of a truncated cone. The sleeve 230 has a continuous sidewall 231 extending from an open top 232 to an open bottom 233. The inner diameter of the sleeve 230 is slightly greater at the top 232 than at the bottom 233.

Figure 11:
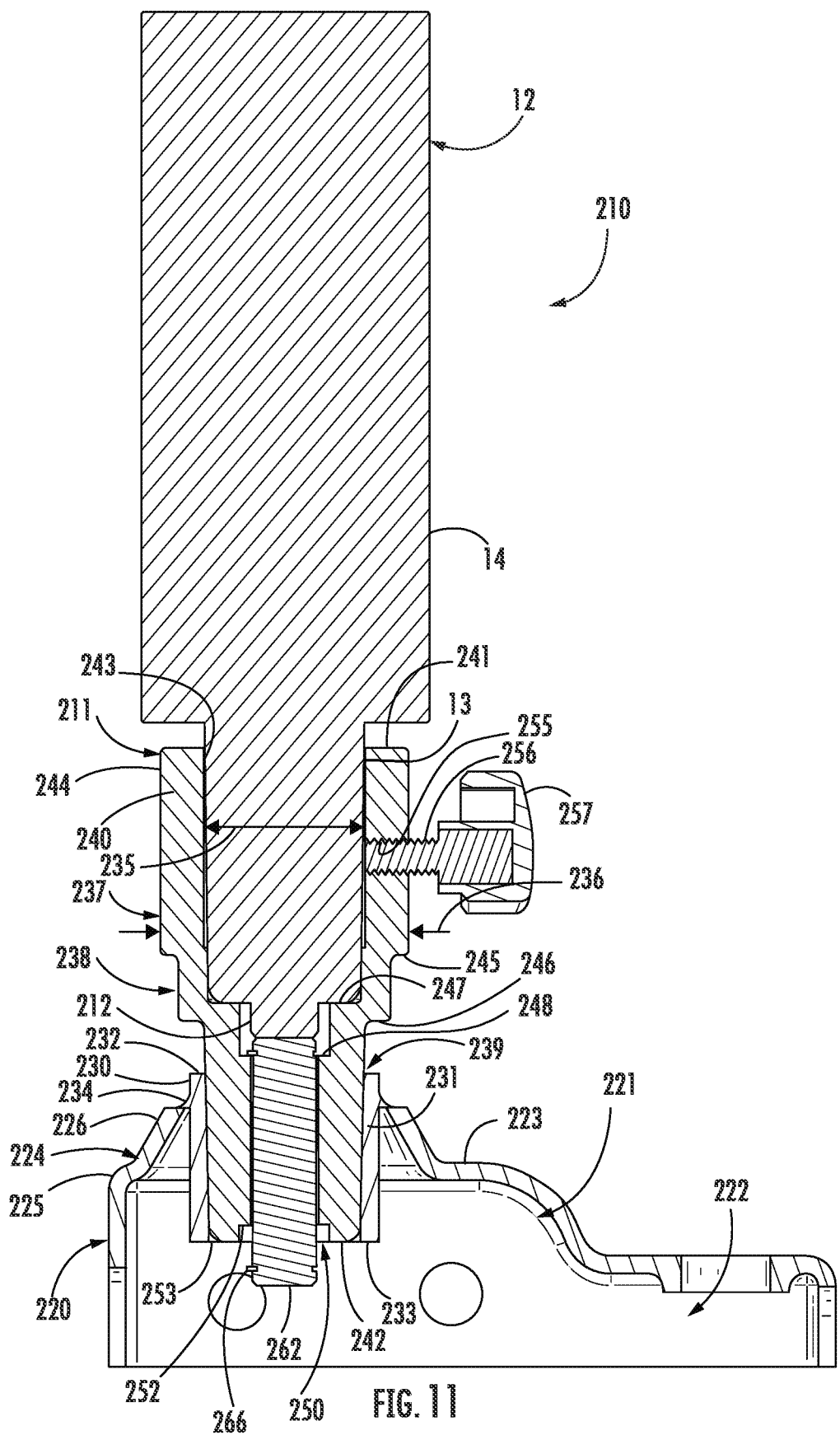
FIG. 11 is a section view taken along the line 11-11 in FIG. 9.

The sleeve 230 is fixed to the cup 224. FIG. 11 illustrates, and FIG. 12a more clearly illustrates, a weld 234 between the sleeve 230 and the cup 224. The weld 234 preferably completely encircles the sleeve 230 at the cup 224 and forms a continuous bond. In other embodiments, other methods of fixing the sleeve 230 to the cup 224 are preferred. The sleeve 230 is fixed in the cup 224 such that the top 232 of the sleeve 230 is just above the top of the cup 224 and the bottom 233 of the sleeve 230 is below the cup 224, within the lower box 221.

Figure 10:
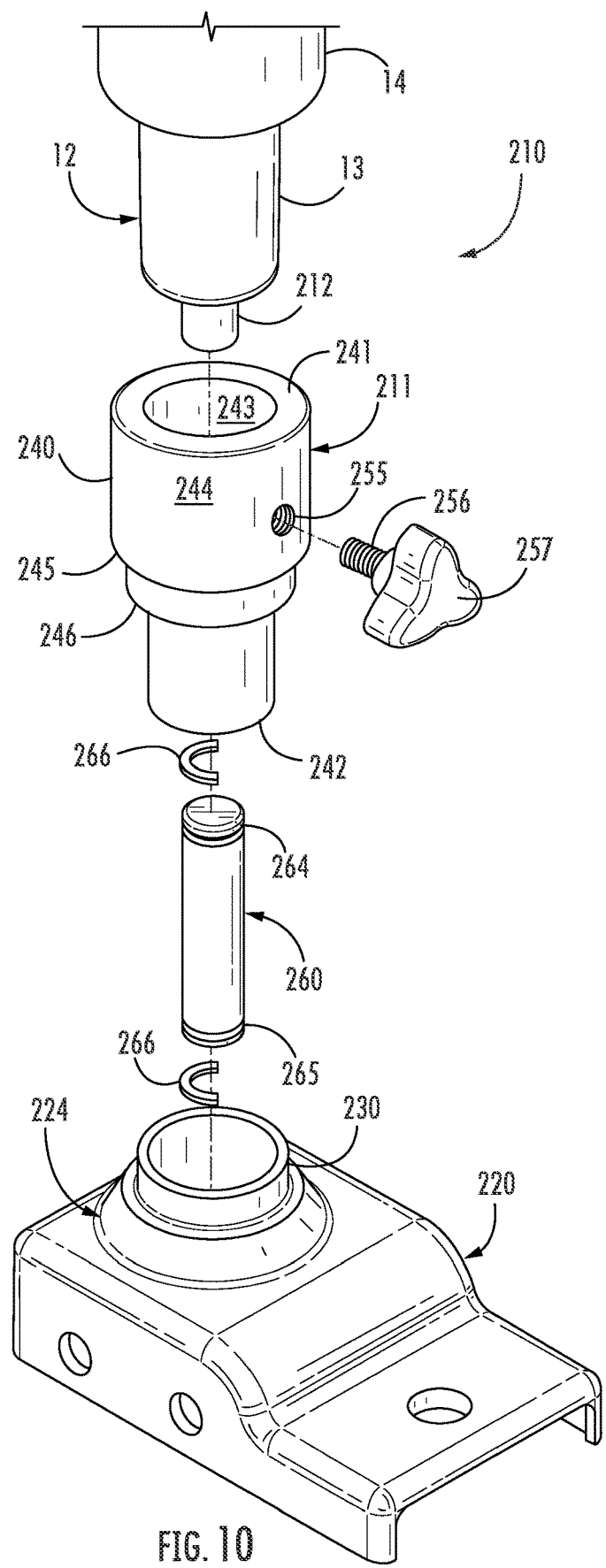
FIG. 10 is an exploded view of the quick-release device of FIG. 9.

The sleeve 230 receives the adapter 211 with a snug compression fit. FIGS. 10 and 11 show the adapter 211 well. The adapter 211 has a unitary sidewall 240 formed in a multi-tiered configuration from an open top 241 to an open bottom 242. The sidewall 240 has an inner surface 243 defining a variable inner diameter 235 and an outer surface 244 defining a variable outer diameter 236. The inner and outer diameters 235 and 236 vary between the top 241 and bottom 242 to define the sidewall 240 with its multi-tiered configuration.

An upper portion 237 of the sidewall 240 extends from the open top 241 of the adapter 211 downward, to a first shoulder 245. Both the inner and outer diameters 235 and 236 are constant from the top 241 to the first shoulder 245. The outer surface 244 of the sidewall 240 turns inward at the shoulder 245, defining a radially-directed underhang, as shown in FIG. 11. The first shoulder 245 thus reduces the outer diameter 236 at the bottom of the upper portion 237 of the sidewall 240.

Below the upper portion 237, the sidewall 240 has an intermediate portion 238. The intermediate portion 238 of the sidewall 240 extends from the first shoulder 245 to a second shoulder 246. The outer diameter 236 of the sidewall 240 is constant from the first shoulder 245 to the second shoulder 246. The inner diameter 235 changes between the first shoulder 245 and the second shoulder 246. The inner diameter 235 is constant entirely from the open top 241, along the upper portion 237, and then along the intermediate portion 238 to a first inner shoulder 247 where the inner diameter 235 reduces. The inner shoulder 247 is located vertically approximately halfway between the first shoulder 245 and the second shoulder 246. The inner shoulder 247 is a radially-directed ledge, as shown in FIG. 11, which reduces the inner diameter 235 of the sidewall 240. The inner diameter 235 of the sidewall 240 is constant from the inner shoulder 247 to just above the open bottom 242 of the adapter 211.

Below the intermediate portion 238, the sidewall 240 has a lower portion 239. The lower portion 239 of the sidewall 240 extends from the second shoulder 246 to the open bottom 242. The outer diameter 236 is constant from the second shoulder 246 to just above the bottom 242. The inner diameter 235 changes between the second shoulder 246 and the bottom 242. The inner diameter 235 is constant from the first inner shoulder 247 to a second inner shoulder 248 where the inner diameter 235 reduces. The second inner shoulder 248 is located vertically close to the second shoulder 246. The second inner shoulder 248 is a radially-directed ledge, as shown in FIG. 11, which reduces the inner diameter 235 of the sidewall 240. The inner diameter 235 of the sidewall 240 is constant from the second inner shoulder 248 along the rest of the length of the lower portion 239, down to the bottom 242.

Just above the open bottom 242, the inner surface has a channel 250 formed radially inward into the sidewall 240. The channel 250 is in communication with the open bottom 242. The channel 250 includes both a sidewall 251 which is recessed within the adapter 211 and an endwall 252 which is above the open bottom 242 (as shown in the view of FIG. 11). The sidewall 251 and endwall 252 are roughly perpendicular to each other. A flat, annular, bottom face 253 of the adapter 211 is defined between the endwall 252 of the channel 250 and the outer surface 244 of the adapter 211.

Figure 12A:
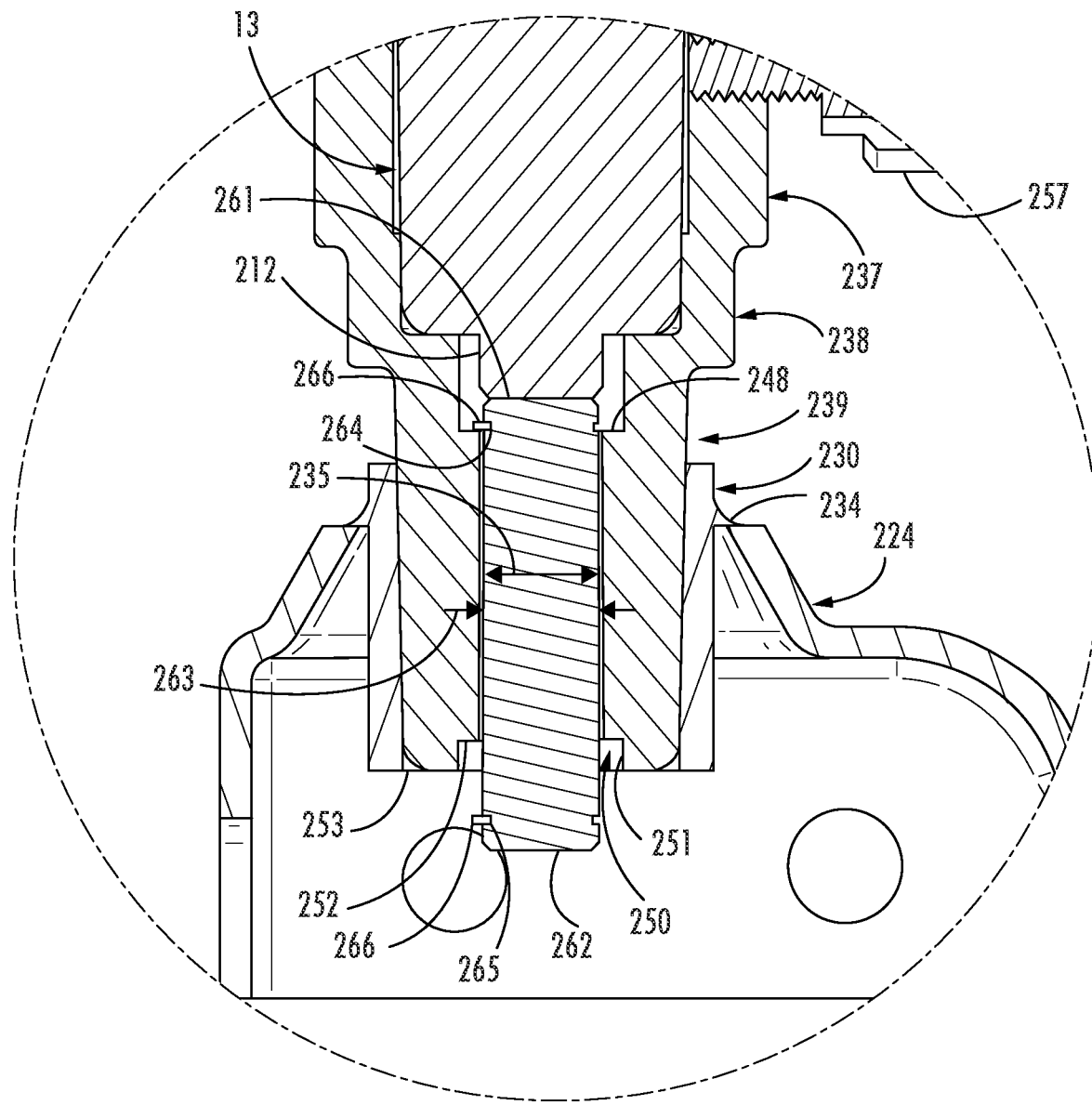
FIGS. 12A and 12B are enlarged section views taken along the line 11-11 showing two arrangements of the quick-release device with respect to the gas cylinder assembly.
Figure 12B:
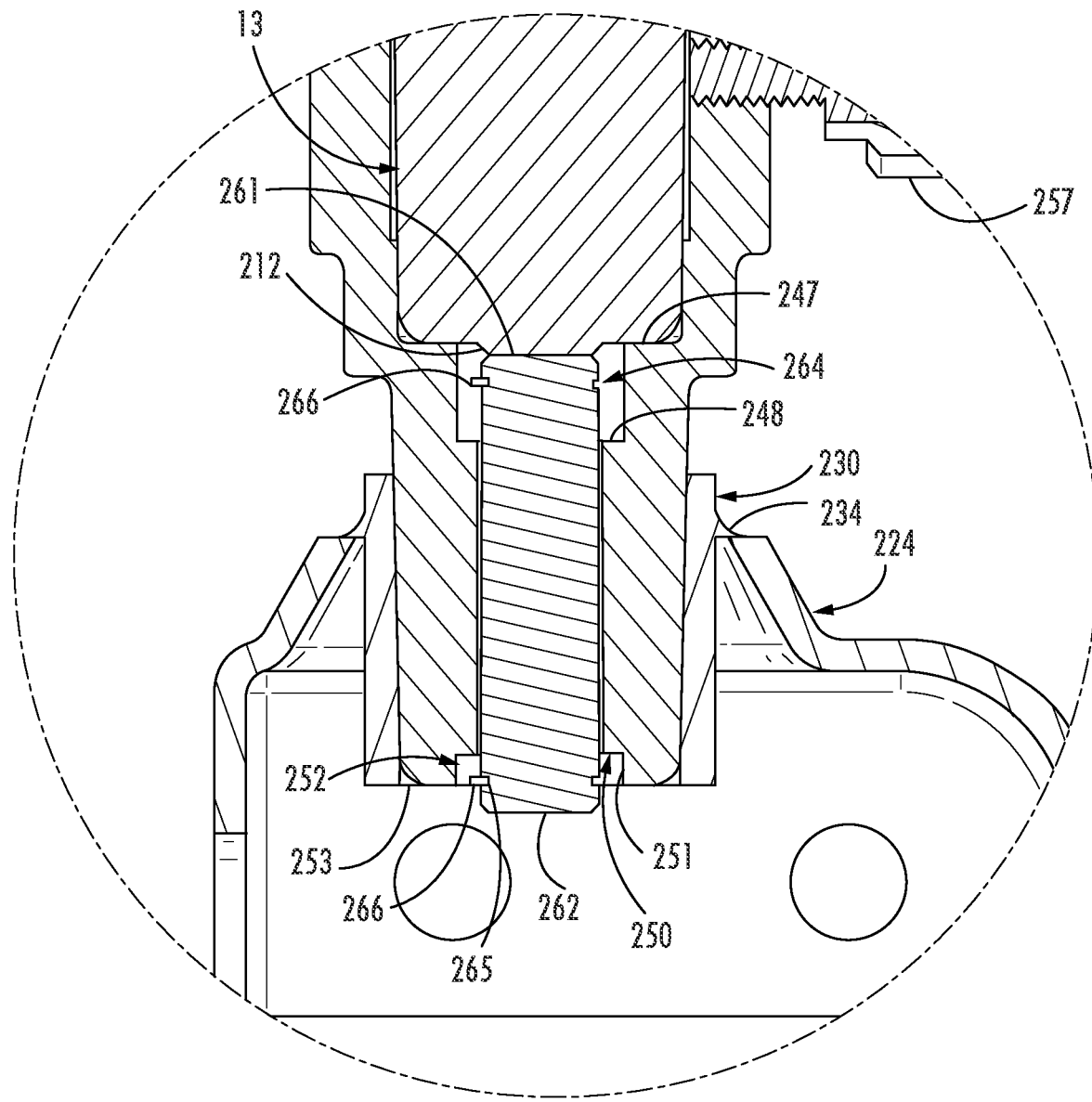

As shown in FIGS. 11, 12a, and 12b, the upper and intermediate portions 237 and 238 of the adapter 211 receive and hold the gas cylinder 12. The gas cylinder 12 includes the sleeve 14 and the rod 13 which reciprocates within the sleeve 14 in response to depression or release of a button 212 at the end of the rod 13.

The adapter 211 can be secured to the rod 13 with a set screw, creating a removable engagement. The sidewall 240 has a threaded hole 255 formed through the upper portion 237 therefore entirely from the outer surface 244 through to the inner surface 243. A threaded bolt 256, fit with a large knob 257, complementarily engages with the threaded hole 255. The knob 257 can be turned to advance or retract the bolt 256 into or out of the threaded hole 255. When the rod 13 is applied to the adapter 211, advancing the threaded bolt 256 causes the inner end of the bolt 256 to contact and press against the rod 13, thereby securing the adapter 211 to the rod 13 in a friction-fit engagement. As such, the threaded bolt 256 and knob 257 define a set screw with respect to the rod 13 and the gas cylinder 12.

The adapter 211 further includes a pin 260 carried for reciprocation within the lower portion 239 of the sidewall 240. The pin 260 is a solid cylindrical rod having opposed top and bottom end faces 261 and 262 and an outer diameter 263. The top end face 261 is a confrontation face.

The pin 260 has two circumferential channels: an upper channel 264 and a lower channel 265. Both the upper and lower channels 264 and 265 are annular recesses formed into the solid body of the pin 260. The channels 264 and 265 preferably extend entirely around the circumference of the pin 260. The upper channel 264 is spaced just below the top end face 261, and the lower channel 265 is spaced just above the bottom end face 262. The channels 264 and 265 hold two clips 266. The outer diameter of the pin 260 is preferably constant from the top end face 261 to the bottom end face 262 except for the channels 264 and 265.

The clips 266 are thin severed rings. Preferably constructed from metal, they have resilient spring characteristics. The inner diameter of each clip 266 is just smaller than the outer diameter of the channels 264 and 265. The outer diameter of each clip 266 is just greater than the outer diameter of the pin 260. When the clips 266 are installed in each of the upper and lower channels 264 and 265, they snap fit into the channels 264 and 265, and their outer edges project radially outward, just slightly out of the channels. In this way, they form interferences just below and above the top and bottom end faces 261 and 262.

The pin 260 is maintained within the adapter 211. The pin 260 is longer than the distance between the second inner shoulder 248 and the endwall 252 of the channel 250 near the bottom 242 of the adapter 211. The distance between the upper and lower channels 264 and 265 in the pin 260 is greater than the distance between the second inner shoulder 248 and the endwall 252.

When installed in the adapter 211, most of the body of the pin 260 is maintained inside the lower portion 239 of the sidewall 240. The clip 266 in the upper channel 264 is above the second inner shoulder 248, and the clip 266 in the lower channel 265 is below the channel 250 in the sidewall 240.

The clips 266 define interferences with the second inner shoulder 248 and the channel 250, allowing the pin 260 to reciprocate within limits. When the pin 260 moves up (in the view of FIG. 11), the clip 266 in the lower channel 265 encounters the endwall 252 and limits upward movement of the pin 260 with respect to the adapter 211. When the pin 260 moves down, the clip 266 in the upper channel 264 encounters the second inner shoulder 248 and limits downward movement of the pin 260 with respect to the adapter 211.

FIGS. 12a and 12b show this upward and downward movement. In FIG. 12a, the pin 260 is moved to a lowered position (again, as seen in the inverted view of the drawing). The pin 260 is down, the bottom end of the pin 260 projects below the bottom face 253 of the adapter 211, and the clip 266 in the lower channel 265 is below the channel 250 near the bottom of the sidewall 240. The clip 266 in the upper channel 264 encounters the second inner shoulder 248 and prevents the pin 260 from moving downward any further.

The outer diameter of the pin 260 corresponds to the inner diameter of the adapter 211 along the intermediate portion 238 of the sidewall 240. In this way, the pin 260 is prevented from moving sideways or laterally rattling within the sidewall 240. The pin 260 is free to rotate within the sidewall 240, and the clips 266 remain in the upper and lower channels 264 and 265.

In FIG. 12b, the pin 260 is moved to a raised position (as seen in the inverted view of the drawing). The pin 260 is up, the bottom end of the pin 260 is drawn up closer to the bottom face 253 of the adapter 211, and the clip 266 in the lower channel 265 is within the channel 250 in the adapter 211. In this embodiment, the clip 266 in the lower channel 265 has not yet reached the endwall 252 and thus has not yet limited the upward movement of the pin 260. Instead, the top end face 261 of the pin 260 confronts and contacts the button 212 and depresses it into the rod 13, thereby activating the rod 13 to move within the housing or sleeve 14 of the gas cylinder 12.

It is noted briefly here that although the drawings show a small clearance between the top 241 of the adapter 211 and the underside of the housing 14 of the gas cylinder 12, in most embodiments, the clearance is greater to allow the rod 13 to reciprocate in and out of the housing 14 with the adapter 211 secured thereto.

In operation, the adapter 211 is pressed into the sleeve 230 in the base 220. The gas cylinder 12 is next applied to the adapter 211 by registering the rod 13 with the open top 241 and passing it therethrough. Weight is applied to the entire assembly, such as by righting the chair and sitting on it. This causes the adapter 211 to form a tight press-fit engagement in the sleeve 230, which near-permanently fixes the adapter 211 to the base 220. The application of weight also causes the gas cylinder 12 to seat within the adapter 211.

Once the gas cylinder 12 is seated within the adapter 211, the user rotates the knob 257 to advance the threaded bolt 256 within the threaded hole 255 until it confronts and bears against the outer wall of the rod 13, thereby setting and fixing the adapter 211 to the rod 13.

In the righted position, the chair with the device 210 can now be operated normally and also disassembled. To raise or lower the chair, the user grasps the lever 96 (not shown, but the same lever as described with respect to the device 10) and moves the lever 96. The lever head presses the bottom face 262 of the pin 260 and pushes the pin 260 further into the adapter 211 (toward the position shown in FIG. 12b). This causes the pin 260 to impact the button 212, which pushes the button 212 into the rod 13, thereby activating the rod 13 to move with respect to the housing 14. Conventionally, when a gas cylinder button is pressed while the gas cylinder is weighted, the rod will retract or move into the housing, and when the gas cylinder button is pressed while the gas cylinder is not weighted, the rod will extend or move out of the housing.

When the user has set the desired height of the chair, the user releases the lever 96. The head of the lever 96 retracts from contact with the pin 260, and the pin 260 floats freely within the adapter 211. Interference between the clips 266 and the second inner shoulder 248 and the channel 250 prevent the pin 260 from falling out of the adapter 211.

Figure 13:
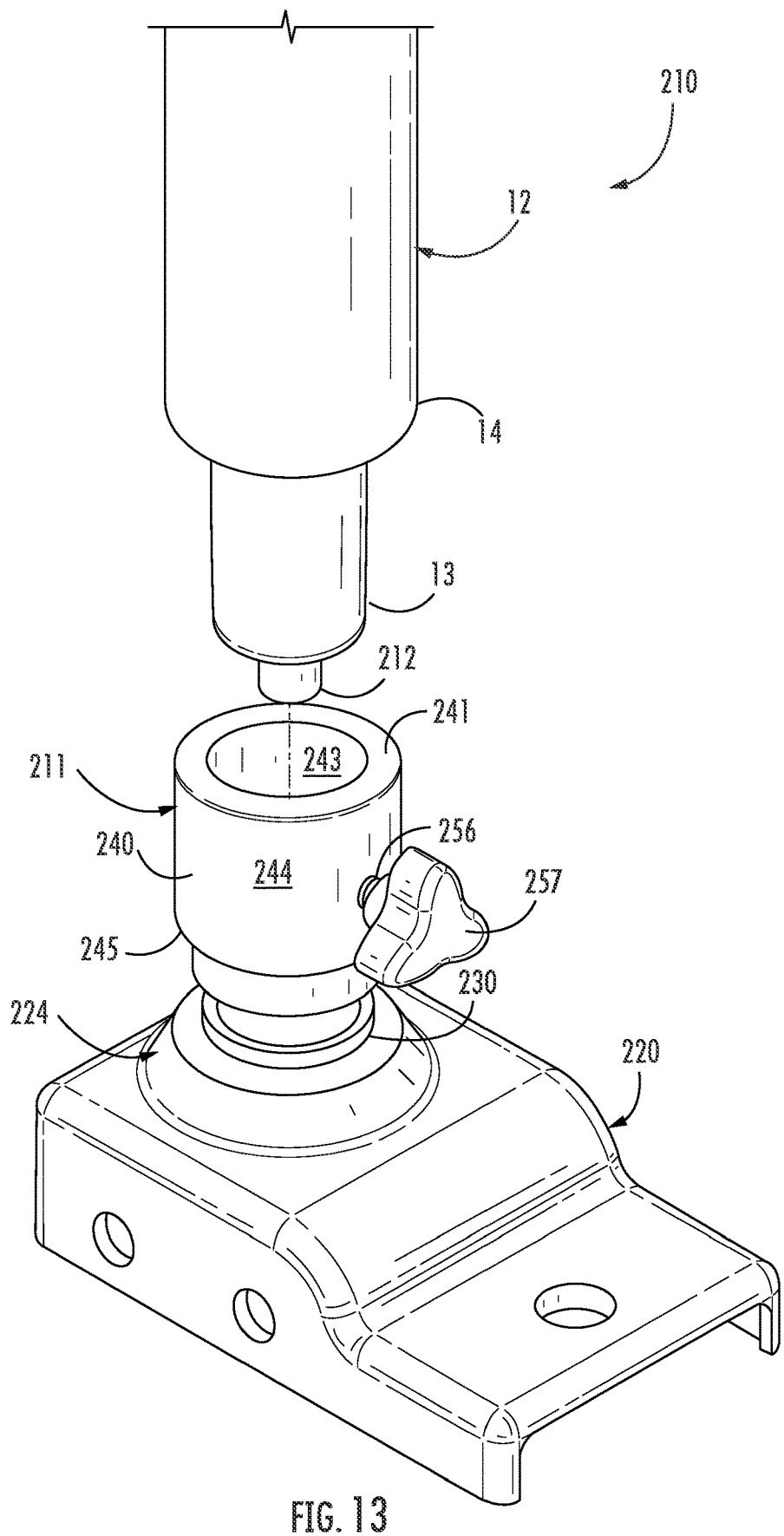
FIG. 13 is an inverted, bottom perspective view of the quick-release device of FIG. 9 with the gas cylinder assembly removed therefrom.

When the user needs to disassemble the chair, the device 210 makes it easy to separate the gas cylinder from the wheelbase. The user simply rotates the knob 257 to retract the threaded bolt 256 from the threaded hole 255, thereby backing the bolt 256 off from contact with the rod 13. This loosens the gas cylinder 12 from the adapter 211, and the gas cylinder 12 can be removed from the adapter 211, as shown in FIG. 13. The adapter 211 remains fixed in the base 220, held in tight press-fit contact with the sleeve 230 in the base 220.

Figure 14:
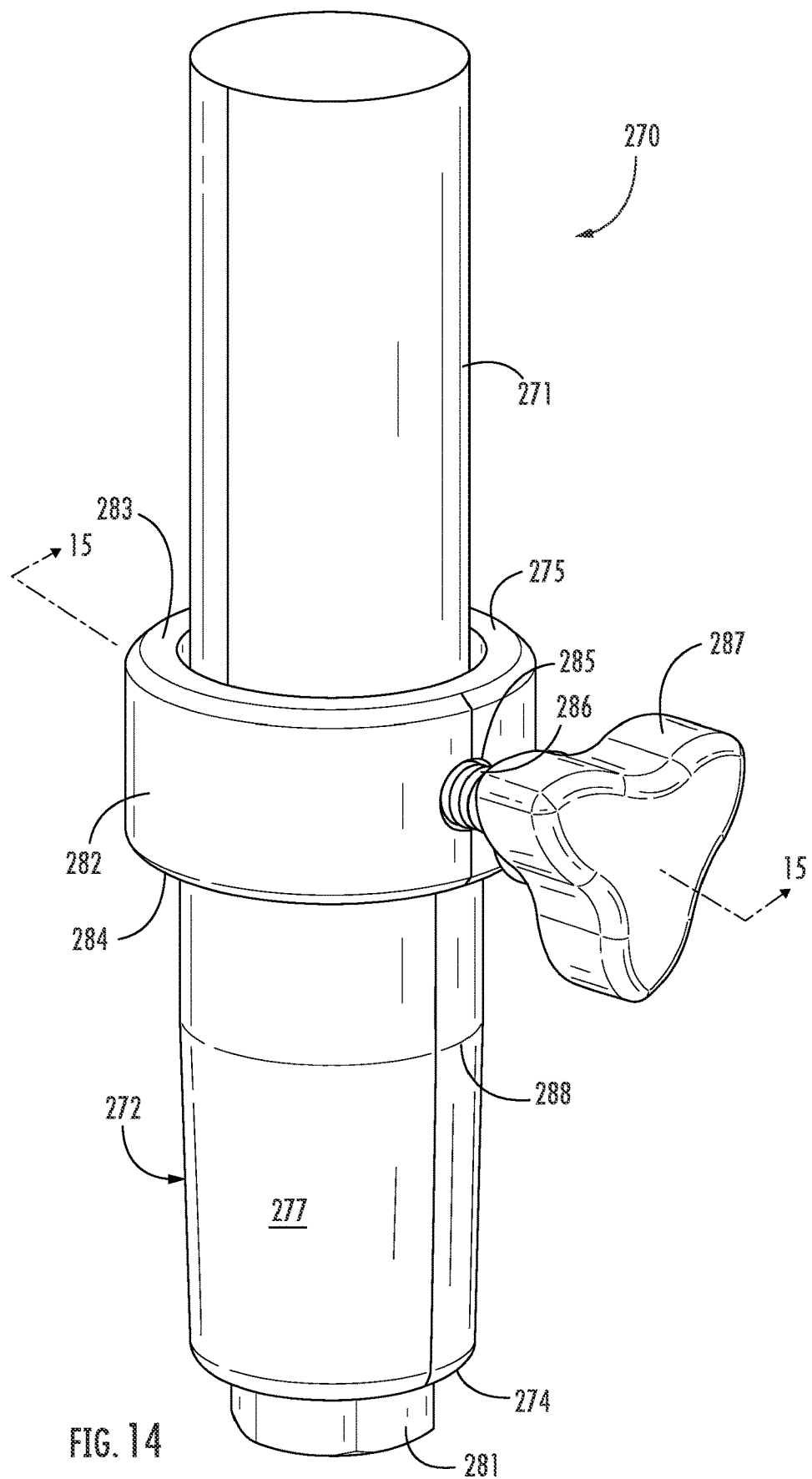
FIG. 14 is an inverted, bottom perspective view of an embodiment of a quick-release device with a gas cylinder assembly.
Figure 15:
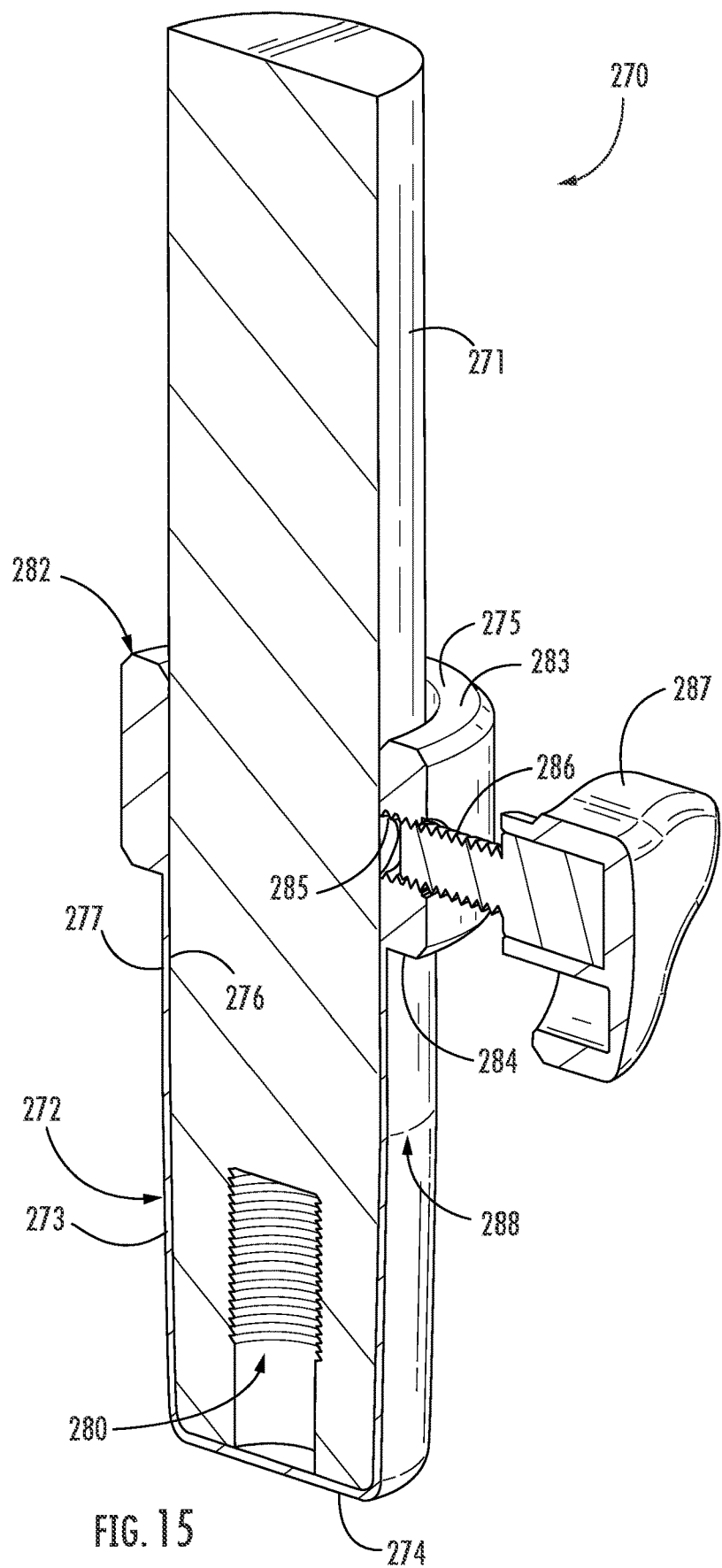
FIG. 15 is a section view taken along the line 15-15 in FIG. 14.

FIGS. 14 and 15 are inverted perspective and section views of an embodiment of a quick-release device 270 (also referred to herein simply as "the device 270") which can be secured to a seat plate of a chair as previously described in this disclosure, such as in FIG. 1. The device 270 is universal: it can receive the rod of any gas or hydraulic cylinder for use with any seat plate or other receptacle on other furniture or other items supported by gas cylinders. For this reason, although reference below is with respect to a seat plate of a chair of the type shown in FIG. 1, the reader will understand that the device 270 is not so limited. FIGS. 14 and 15 both show a piston 271 of a chair. The piston 271 is exemplary of a smaller-diameter piston often used in heavy hydraulic-based lift chairs in salons.

The device 270 fits onto the piston 271 so that the piston 271 can be easily removed from a seat plate of a chair. The device 270 includes a sleeve 272 fit over the piston 271.

The sleeve 272 is a blind tube having a thin sidewall 273 extending from an endwall 274 to a top 275. The sidewall 273 preferably extends continuously around in a full cylinder. The sidewall 273 has an inner surface 276 and an opposed outer surface 277. The thickness of the sidewall 273 between the inner and outer surfaces 276 and 277 is preferably approximately one-eighth of an inch, but is more or less in other embodiments.

The endwall 274 of the sleeve 272 caps the sleeve 272, extending laterally or perpendicularly to the sidewall 273 and thereby bounding an inner space contained by the sidewall 273 and endwall 274. The sidewall 273 and endwall 274 are unitary and formed integrally to each other.

In the embodiment shown in FIGS. 14 and 15, the piston 271 has a threaded recess 280 formed into the end of the piston 271. In hydraulic lift chairs used in salons, this threaded recess 280 receives a bolt that attaches the piston 271 to the underside of the chair. Here, the endwall 274 covers the recess 280. Other types of pistons 271 may or may not have such a recess 280.

The sidewall 273 tapers from an axial location 288 to the endwall 274. In other words, the outer diameter of the sidewall 273 is greater at the axial location 288 than it is at the endwall 274.

Opposite the endwall 274, at the top 275, is a ring 282 formed unitarily and integrally to the sidewall 273. The ring 282 is a radial extrusion of the sidewall 273, or a large flange. The ring 282 has a top 283 and a bottom 284. The top 283 of the ring 282 and the top 275 of the sleeve 272 are coextensive.

The device 270 can be secured to the piston 271 with a set screw. The ring 282 has a threaded hole 285 formed entirely through the body of the ring 282. A threaded bolt 286, fit with a large knob 287, complementally engages with the threaded hole 285. The knob 287 can be turned to advance or retract the bolt 286 into or out of the threaded hole 285. When the piston 271 is inserted into the sleeve 272, advancing the threaded bolt 286 causes the inner end of the bolt 286 to contact and press against the piston 271, thereby securing the sleeve 272 over the piston 271 in a friction-fit engagement.

Application of the device 270 over the piston 271 allows a smaller-diameter piston to be inserted into an office chair seat plate design for a larger-diameter gas cylinder. When the user needs to disassemble the chair, the device 270 makes it easy to do so. The user simply rotates the knob 287 to retract the threaded bolt 286 from the threaded hole 285, thereby backing the bolt 286 off from contact with the piston 271. This loosens the piston 271 from the device 270, and the piston 271 can be removed from the device 270. The device 270 remains fixed in the seat plate, held in tight press-fit contact.

A preferred embodiment is fully and clearly described above so as to enable one having skill in the art to understand, make, and use the same. Those skilled in the art will recognize that modifications may be made to the description above without departing from the spirit of the specification, and that some embodiments include only those elements and features described, or a subset thereof. To the extent that modifications do not depart from the spirit of the specification, they are intended to be included within the scope thereof.

What is claimed is:

1. A quick-release device for securing a rod of a gas cylinder in a seat plate and activating the rod with a button thereon, wherein the seat plate includes a sleeve, the quick-release device comprising:
an adapter fit into the sleeve, the adapter including an upper portion and a lower portion with different inner and outer diameters; and
a pin maintained in the adapter for reciprocal movement to depress the button on the rod, wherein the pic includes two clips which project radially outward to define interferences with the inner diameter of the adapter to limit the reciprocal movement of the pin;
wherein the lower portion of the adapter is received in the sleeve in a press-fit engagement; and
the upper portion is configured to receive the rod of the gas cylinder in a removable engagement.

2. The quick-release device of claim 1, wherein the sleeve is tapered.

3. The quick-release device of claim 1, wherein the outer diameter of the upper portion of the adapter is greater than the outer diameter of the lower portion.

4. The quick-release device of claim 1, further comprising a set screw extending through the upper portion of the adapter to secure the rod in the upper portion when applied thereto.

5. The quick-release device of claim 1, wherein the pin includes a top face configured for confrontation with the button and depression thereof.

6. A quick-release device for securing a rod of a gas cylinder in a seat plate having a sleeve and activating the rod with a button thereon, the quick-release device comprising:
a sleeve having a tapered inner diameter;
an adapter fit into the sleeve, the adapter including an upper portion and a lower portion, each with inner and outer diameters; and
a pin maintained in the lower portion of the adapter for reciprocal movement to depress the button on the rod;
wherein the sleeve is configured to receive the lower portion of the adapter in a press-fit engagement; and
the upper portion is configured to receive the rod of the gas cylinder in a removable engagement.

7. The quick-release device of claim 6, wherein the sleeve is fixed to the seat plate.

8. The quick-release device of claim 6, wherein the outer diameter of the upper portion of the adapter is greater than the outer diameter of the lower portion.

9. The quick-release device of claim 6, further comprising a set screw extending through the upper portion of the adapter to secure the rod in the upper portion when applied thereto.

10. The quick-release device of claim 6, wherein the pin includes two clips which project radially outward to define interferences with the inner diameter of the adapter to limit the reciprocal movement of the pin.

11. The quick-release device of claim 10, wherein the pin includes a top face configured for confrontation with the button and depression thereof.

12. A quick-release device for securing a rod of a gas cylinder in a seat plate and activating the rod with a button thereon, the quick-release device comprising:
a sleeve;
an adapter fit into the sleeve, the adapter including an upper portion and a lower portion, each with inner and outer diameters; and
a pin maintained in the adapter for reciprocal movement to depress the button on the rod, wherein the pin includes two interferences which project radially outward form the pin to contact the inner diameters of the adapter to limit the reciprocal movement of the pin;
wherein the sleeve is configured to receive the lower portion of the adapter in a press-fit engagement; and
the upper portion is configured to receive the rod of the gas cylinder in a removable engagement.

13. The quick-release device of claim 12, wherein the sleeve has a tapered inner diameter.

14. The quick-release device of claim 12, wherein the outer diameter of the upper portion of the adapter is greater than the outer diameter of the lower portion.

15. The quick-release device of claim 12, further comprising a set screw extending through the upper portion of the adapter to secure the rod in the upper portion when applied thereto.

16. The quick-release device of claim 12, wherein the pin includes a top face configured to confrontation with the button and depression thereof.

* * * * *